(12) United States Patent
Tasaka et al.

(10) Patent No.: US 7,776,968 B2
(45) Date of Patent: Aug. 17, 2010

(54) THERMOPLASTIC ELASTOMER COMPOSITION AND THERMOPLASTIC RESIN COMPOSITION USING THE SAME

(75) Inventors: Michihisa Tasaka, Kanagawa (JP); Satoshi Takahashi, Tokyo (JP)

(73) Assignee: Riken Technos Corp., Tokyo (JP)

( * ) Notice: Subject to any disclaimer, the term of this patent is extended or adjusted under 35 U.S.C. 154(b) by 246 days.

(21) Appl. No.: 11/049,107

(22) Filed: Feb. 3, 2005

(65) Prior Publication Data

US 2005/0187355 A1  Aug. 25, 2005

(30) Foreign Application Priority Data

Feb. 20, 2004 (JP) ............................. 2004-044131
Oct. 26, 2004 (JP) ............................. 2004-310661

(51) Int. Cl.
C08F 8/00 (2006.01)
C08F 4/00 (2006.01)
C08L 33/02 (2006.01)
C08L 9/00 (2006.01)
C08L 47/00 (2006.01)
C08L 25/02 (2006.01)

(52) U.S. Cl. ..................... 525/192; 525/194; 525/221; 525/232; 525/236; 525/241; 525/244

(58) Field of Classification Search ................. 525/192, 525/194, 221, 232, 236, 241, 244
See application file for complete search history.

(56) References Cited

U.S. PATENT DOCUMENTS 5,210,134 A * 5/1993 Akkapeddi et al. ............ 525/64
5,604,290 A 2/1997 Aikawa et al.
7,105,611 B2 * 9/2006 Kimura et al. ............... 525/314

FOREIGN PATENT DOCUMENTS

| DE | 37 34 259 A1 | 7/1988 |
|----|---|---|
| EP | 0 259 623 A2 | 3/1988 |
| EP | 1 086 991 A1 | 9/2000 |
| JP | 59-6236 | 1/1984 |
| JP | 63-57662 | 3/1988 |
| JP | 1-139241 | 5/1989 |
| JP | 1-230660 | 9/1989 |
| JP | 2-97554 | 4/1990 |
| JP | 3-11291 | 2/1991 |
| JP | 3-100045 | 4/1991 |
| JP | 3-49927 | 7/1991 |
| JP | 3-234745 | 10/1991 |
| JP | 3-234755 | 10/1991 |
| JP | 5-171003 | 7/1993 |
| JP | 5-214209 | 8/1993 |
| JP | 5-75016 | 10/1993 |
| JP | 6-13628 | 2/1994 |
| JP | 6-238827 | 8/1994 |
| JP | 7-126474 | 5/1995 |
| JP | 7-268174 | 10/1995 |
| JP | 2002 239518 | 9/2000 |
| JP | 2001 234021 | 8/2001 |
| JP | 2001-288332 | 10/2001 |
| JP | 2002 234985 | 8/2002 |
| JP | 2003-20382 | 1/2003 |
| JP | 2003-268193 | 9/2003 |
| JP | 2003-286384 | 10/2003 |

OTHER PUBLICATIONS

Search Report for Austria Application No. 200500622-6 dated Jul. 21, 2006.
European Patent Office—Search Report dated Mar. 16, 2005.
Office Action for corresponding Japan Patent Application No. 2004/310,661, dated Oct. 26, 2009.

* cited by examiner

*Primary Examiner*—William K Cheung
(74) *Attorney, Agent, or Firm*—Finnegan, Henderson, Farabow, Garrett & Dunner, L.L.P.

(57) ABSTRACT

The invention provides a thermoplastic elastomer composition comprising: (a) 100 parts by weight of a hydrogenated block copolymer; (b) 0.01 to 3 parts by weight of an organic peroxide; and (c) 1 to 80 parts by weight of a carboxylated liquid polybutadiene. Also disclosed is a thermoplastic resin composition comprising the thermoplastic elastomer composition.

12 Claims, No Drawings

THERMOPLASTIC ELASTOMER COMPOSITION AND THERMOPLASTIC RESIN COMPOSITION USING THE SAME

FIELD OF THE INVENTION

The present invention relates to a thermoplastic elastomer composition and a thermoplastic resin composition (alloyed product) using the thermoplastic elastomer composition. Particularly, it relates to a thermoplastic elastomer composition rich in flexibility, excellent in thermal deformation resistance and moldability, excellent in compatibility, with a resin having a polar group, and capable of softening the resin having a polar group due to the excellent flexibility, and relates to a thermoplastic resin composition using the same rich in flexibility, excellent in bleeding resistance, and less in gas generation and entrainment of bubbles into molded articles during the molding.

BACKGROUND OF THE INVENTION

Recently, thermoplastic elastomers which are soft materials having rubber elasticity, require no vulcanizing step, and are capable of molding and recycling similarly to thermoplastic resins have been widely used in the fields of automobile parts, electric appliance parts, wire covering, medical parts, footwear, sundries, etc.

Among the thermoplastic elastomers, polystyrene-based thermoplastic elastomers such as styrene-butadiene block polymers (SBS) and styrene-isoprene block polymers (SIS) which are block copolymers of aromatic vinyl compounds-conjugate diene compounds are rich in flexibility and have a good rubber elasticity at ordinary temperature, and thermoplastic elastomer compounds obtained from them are excellent in processability and have widely used as substitutes for vulcanized rubbers.

Moreover, elastomer compositions obtained by hydrogenating intramolecular double bonds of block copolymers of styrene and conjugate dienes in these elastomers have been further widely used as elastomers having improved thermal aging resistance (thermal stability) and weathering resistance.

However, the thermoplastic elastomer compositions using these hydrogenated block copolymers contain problems in rubbery properties such as oil resistance, heat and pressure deformation ratio (compression set), and rubber elasticity at a high temperature and, as those improving these points, there are proposed crosslinked compounds obtained by crosslinking compositions containing hydrogenated derivatives of the above block copolymers (for example, cf. Patent Documents 1 to 5).

Moreover, the crosslinked compositions of hydrogenated block copolymers disclosed in the above Patent documents contain a problem that compression set at a high temperature, particularly 100° C. is still insufficient and mechanical strength tends to decrease. Thus, it is current situation that a performance level required for applications of conventional vulcanized rubbers is not achieved. In addition, there are problems in view of molding that shape retention becomes worse owing to low melt tension at a high temperature in extrusion molding and a molding cycle is prolonged in injection molding.

Furthermore, attempts of blending these thermoplastic elastomers with resins each having a polar group, such as polyamide-based polymers, polyester-based polymers, or polyurethane-based polymers have been made. For example, there are proposed melt blends of thermoplastic polymers selected from hydrogenated SBS block copolymers, olefinic elastomers, diene-based elastomers, urethane-based elastomers, and plasticized polyvinyl chloride and polyester-based thermoplastic elastomers or polyether block amides (for example, cf. Patent Documents 6 and 7).

However, the compositions have a bad property balance between compression set and hardness and also have insufficient compatibility, so that they have a defect that flexural fatigue properties and abrasion resistance are bad.

In order to solve the problems, there are disclosed a composition excellent in flexibility, thermal resistance and chemical resistance and having an improved compatibility, which is obtained by adding a modified polystyrene-based resin and/or modified polyolefin-based resin containing an epoxy group, an acid anhydride group or an oxazoline group to a composition containing a hydrogenated derivative of a block copolymer and a polyester-based resin (for example, cf. Patent Document 8) and a composition comprising a hydrogenated derivative of a block copolymer, a hydrogenated derivative containing a carboxylic acid group or its derivative group, and further a polyolefin resin and a thermoplastic polyester (for example, Patent Documents 9 and 10).

Moreover, there are disclosed a composition comprising a hydrogenated derivative of a block copolymer, a hydrogenated derivative containing a carboxylic acid group or its derivative group and further a thermoplastic polyurethane (for example, Patent Documents 11 to 14) and a composition comprising a hydrogenated derivative of a block copolymer, a hydrogenated derivative containing an epoxy group or its derivative group and further a thermoplastic polyurethane (for example, Patent Document 15). Furthermore, there is disclosed a technology of obtaining a molded article having a high peeling strength by bringing a vulcanized elastomer having a dicarboxylic acid anhydride group, such as a carboxylated polybutadiene, into direct contact with a thermoplastic elastomer having a polyamide block (for example, cf. Patent Document 16).

However, all the compositions also have defects that they are still insufficient in compatibility with thermoplastic elastomers, tensile properties at a high temperature, particularly 100° C., becomes worse, and further a property balance between compression set and hardness is bad. Moreover, depending on the alloy ratio with the thermoplastic elastomer, there are defects that moldability becomes worse, i.e., generation of surface layer peeling and flow mark in injection molding and generation of gum and rough surface in extrusion molding, and further low-molecular-weight components bleed out.

Furthermore, the present inventors have invented a thermoplastic resin composition of a resin having a polar group and a thermoplastic elastomer composition comprising a hydrogenated product or the like of a block copolymer, an ester-based compound, an organic peroxide (for example, cf. Patent Document 17), a thermoplastic resin composition comprising a polyacetal resin and a thermoplastic elastomer comprising a hydrogenated product of a block copolymer, a rubber softener, an organic peroxide, and a liquid polybutadiene having a hydroxyl group at the terminal (for example, cf. Patent Document 18), and a thermoplastic elastomer composition excellent in compatibility with a resin having a polar group obtained by graft polymerization of an elastomer with a monomer by blending an elastomer mixture of two kinds of hydrogenated block copolymers having different hydrogenation ratios, i.e., a hydrogenated block copolymer having a high hydrogenation rate and a hydrogenated block copolymer having a low hydrogenation rate, in a specific ratio with a rubber softener, an organic peroxide, a liquid polybutadiene having a hydroxyl group at the terminal, and optionally, various monomers (cf. Patent Document 19), but there arise a problem of occurrence of troubles that a large amount of gas generates during the molding depending on molding conditions and thus working environment becomes worse as well as bubbles tend to generate inside the molded articles in some cases.

Patent Document 1: JP 59-6236 A
Patent Document 2: JP 63-57662 A
Patent Document 3: JP 3-49927 B
Patent Document 4: JP 3-11291 B
Patent Document 5: JP 6-13628 B
Patent Document 6: JP 1-139241 A
Patent Document 7: JP 3-100045 A
Patent Document 8: JP 5-214209 A
Patent Document 9: JP 5-75016 B
Patent Document 10: JP 1-230660 A
Patent Document 11: JP 3-234745 A
Patent Document 12: JP 3-234755 A
Patent Document 13: JP 5-171003 A
Patent Document 14: JP 7-126474 A
Patent Document 15: JP 2-97554 A
Patent Document 16: JP 6-238827 A
Patent Document 17: JP 2003-20382 A
Patent Document 18: JP 2003-268193 A
Patent Document 19: JP 2003-286384 A

SUMMARY OF THE INVENTION

In view of the above problems, an object of the invention is to provide a thermoplastic elastomer composition rich in flexibility, excellent in thermal deformation resistance and moldability, excellent in compatibility with a resin having a polar group, and capable of softening the resin having a polar group owing to the excellent flexibility.

Another object of the invention is to provide a thermoplastic resin composition comprising the thermoplastic elastomer composition, which is rich in flexibility, excellent in bleeding resistance, and less in gas generation and entrainment of bubbles into molded articles during the molding.

Other objects and effects of the invention will become apparent from the following description.

As a result of extensive studies for achieving the above objects, the present inventors have found that a thermoplastic elastomer composition rich in flexibility, excellent in thermal deformation resistance and moldability, excellent in compatibility with a resin having a polar group, and capable of softening the resin having a polar group owing to the excellent flexibility and a thermoplastic resin composition using the same rich in flexibility, excellent in bleeding resistance, and less in gas generation and entrainment of bubbles into molded articles during the molding are obtained by blending a hydrogenated block copolymer, an organic peroxide, a carboxylated liquid polybutadiene, and optionally, a rubber softener and an isobutylene-based block copolymer excellent in compatibility with a polar group-containing resin and inert to the organic peroxide and by heating the blend. Thus, they have accomplished the invention.

That is, the foregoing objects of the present invention have been achieved by providing the following thermoplastic elastomer compositions, thermoplastic resin compositions and molded article.

1. A thermoplastic elastomer composition comprising:
(a) 100 parts by weight of a hydrogenated block copolymer;
(b) 0.01 to 3 parts by weight of an organic peroxide; and
(c) 1 to 80 parts by weight of a carboxylated liquid polybutadiene.

2. The thermoplastic elastomer composition according to item 1 above, wherein a vinyl 1,2-bond in the microstructure of the polybutadiene of the component (c) accounts for 30% by weight or less.

3. The thermoplastic elastomer composition according to item 1 or 2 above, wherein a cis-1,4-bond in the microstructure of the polybutadiene of the component (c) accounts for 40% by weight or more.

4. The thermoplastic elastomer composition according to any one of items 1 to 3 above, wherein the component (a) comprises a hydrogenated block copolymer obtained by hydrogenating 50% or more of a conjugate diene block of a block copolymer comprising at least two polymer blocks A mainly comprising an aromatic vinyl compound and at least one polymer block B mainly comprising a conjugated diene compound, and/or a hydrogenated product of a conjugated diene block copolymer.

5. The thermoplastic elastomer composition according to any one of items 1 to 3 above, wherein the component (a) comprises:
(i) 95 to 5% by weight of a hydrogenated block copolymer obtained by hydrogenating 90% or more of a conjugate diene block of a block copolymer comprising at least two polymer blocks A mainly comprising an aromatic vinyl compound and at least one polymer block B mainly comprising a conjugated diene compound; and
(ii) 5 to 95% by weight of a hydrogenated block copolymer obtained by hydrogenating 50% to less than 90% of a conjugate diene block of a block copolymer comprising at least two polymer blocks A mainly comprising an aromatic vinyl compound and at least one polymer block B mainly comprising a conjugated diene compound.

6. The thermoplastic elastomer composition according to item 4 or 5 above, wherein the number average molecular weight of the component (a) in terms of polystyrene is in the range of 50,000 to 400,000.

7. The thermoplastic elastomer composition according to any one of items 1 to 6 above, which further comprises (d) 1 to 350 parts by weight of a rubber softener.

8. The thermoplastic elastomer composition according to any one of items 1 to 7 above, which further comprises (e) 0.02 to 10 parts by weight of an ester-based crosslinking aid.

9. The thermoplastic elastomer composition according to any one of items 1 to 8, which further comprises (f) 1 to 500 parts by weight of an isobutylene-based block copolymer comprising an isobutylene-based polymer block and an aromatic vinyl-based polymer block.

10. The thermoplastic elastomer composition according to any one of items 1 to 9, which further comprises (g) 1 to 200 parts by weight of an inorganic filler.

11. A thermoplastic resin composition comprising:
5 to 75% by weight of the thermoplastic elastomer composition according to any one of items 1 to 10 above; and
95 to 25% by weight of a resin having a polar group.

12. The thermoplastic resin composition according to item 11 above, wherein the resin having a polar group is at least one resin selected from the group consisting of ionomers, acrylic rubbers, ethylene-ethyl acrylate copolymers, ethylene-methacrylate copolymers, ethylene-vinyl acetate copolymers, saponified ethylene-vinyl acetate copolymers, polyamide-based resins, polyamide-based thermoplastic elastomers, biodegradable polyester-based resins, polyester-based resins, polyester-based thermoplastic elastomers, urethane-based thermoplastic elastomers, polyacetals, nitrile-butadiene rubbers, and partially crosslinked nitrile-butadiene rubbers.

13. A molded article comprising the thermoplastic resin composition according to item 11 or 12 above.

The thermoplastic elastomer composition of the invention has characteristics that it is rich in flexibility, excellent in thermal deformation resistance and moldability, excellent in compatibility with a resin having a polar group, and capable of softening the resin having a polar group due to the excellent flexibility. Moreover, the thermoplastic resin composition comprising the thermoplastic elastomer composition has characteristics that it is rich in flexibility, excellent in bleeding resistance, and less in gas generation and entrainment of bubble into molded articles during the molding.

DETAILED DESCRIPTION OF THE INVENTION

The following will describe the components constituting the invention, the process for production, and uses in detail.

1. Constituting Components of Thermoplastic Elastomer Composition (a) Hydrogenated Block Copolymer:

The hydrogenated block copolymer (a) component to be used in the thermoplastic elastomer composition of the invention includes styrene-based hydrogenated block copolymers and/or hydrogenated products of conjugated diene block copolymers.

The above styrene-based hydrogenated block copolymer is a hydrogenated product obtained by hydrogenating 50% or more of the aliphatic double bond part derived from the conjugated diene in the conjugated diene block of a block copolymer comprising at least two polymeric blocks (A) mainly comprising an aromatic vinyl compound and at least one polymeric block (B) mainly comprising a conjugated diene compound. For example, there may be mentioned hydrogenated products obtained by hydrogenating 50% or more of the conjugated diene block of aromatic vinyl compound-conjugated diene compound block copolymers each having a structure of A-B-A, B-A-B-A, A-B-A-B-A, or the like Preferably, the polymeric block A mainly comprising an aromatic vinyl compound consists solely of the aromatic vinyl compound or is a copolymer block comprising 50% by weight or more, preferably 70% by weight or more, of an aromatic vinyl compound and a hydrogenated conjugated diene compound.

Preferably, the polymeric block B mainly comprising a hydrogenated conjugated diene compound is composed solely of a hydrogenated conjugated diene compound or is a copolymer block comprising 50% by weight or more, preferably 70% by weight or more, of a hydrogenated conjugated diene compound and an aromatic vinyl compound.

The above block copolymer contains 5 to 60% by weight, preferably 20 to 50% by weight, of an aromatic vinyl compound.

The aromatic vinyl compound constituting the block copolymer may be one or more compounds selected from, for example, styrene, α-methylstyrene, vinyltoluene, p-tert-butylstyrene, and the like and particularly, styrene is preferred. The conjugated diene compound may be one or more compounds selected from, for example, butadiene, isoprene, 1,3-pentadiene, 2,3-dimethyl-1,3-butadiene, and the like and particularly, butadiene, isoprene, and a combination thereof are preferred.

In the polymeric block A mainly comprising the aromatic vinyl compound and the polymeric block B mainly comprising the hydrogenated conjugated diene compound, the units derived from the conjugate diene compound or the aromatic vinyl compound may be distributed at random, in a tapered manner (i.e., the ratio of a certain monomer unit increases or decreases along a molecular chain), in a form of partial block, or any combination thereof. When two or more of the polymeric blocks A mainly comprising an aromatic vinyl compound or two or more of the polymeric blocks B mainly comprising a hydrogenated conjugated diene compound are present, they may be same or different from each other in structure.

These block copolymers can be obtained according to known methods, for example, the method described in JP 40-23798 B, by block polymerization in an inert solvent using a lithium catalyst or a Ziegler-type catalyst. The hydrogenated block copolymers may be obtained by hydrogenating the above block copolymers according to known methods. The hydrogenation mainly hydrogenates aliphatic double bonds derived from the conjugated diene of the conjugated diene block and the hydrogenation ratio is necessarily 50% or more. When the hydrogenation ratio is less than 50%, flexibility and transparency tend to decrease.

The number average molecular weight (Mn) of the hydrogenated block copolymer (a) in terms of polystyrene is in the range of 50,000 to 400,000, preferably 60,000 to 350,000, more preferably 65,000 to 300,000, and molecular weight distribution (a ratio of the weight average molecular weight (Mw) to the number average molecular weight (Mn), Mw/Mn) is preferably 5 or less, more preferably 2 or less. The molecule structure of the block copolymer may be linear, branched, radial, or any combination thereof.

When the number average molecular weight (Mn) is less than the above lower limit, mechanical properties decreases in the thermoplastic elastomer and also mechanical properties and scratch resistance decrease in an alloy with a resin having a polar group. On the other hand, when it exceeds the upper limit, moldability becomes worse. In this connection, the molecular weight in the invention is a value determined by GPC using polystyrenes having known molecular weights as standards. Therefore, the value is a relative value and is not an absolute value and there is variation of ±30% depending on GPC conditions such as standard samples, an apparatus, a data processing method.

Specific examples of the hydrogenated block copolymer of the component (a) include styrene-ethylene•butene-styrene copolymers (SEBS), styrene-ethylene•propylene-styrene copolymers (SEPS), styrene-ethylene•ethylene•propylene-styrene copolymers (SEEPS), partially hydrogenated styrene-butadiene-styrene copolymers (SBBS), partially hydrogenated styrene-isoprene-styrene copolymers, partially hydrogenated styrene-isoprene•butadiene-styrene copolymers, and the like. In the invention, the hydrogenated products of the aromatic vinyl compound-conjugate diene compound block copolymers may be used solely or as a mixture of two or more of them.

As the component (a), when delicate adjustment of moldability (in injection molding, a defect in the vicinity of product gate and flow mark, and, in extrusion molding, gum reduction and a defect at a product end (a defect that portions intended to be edged in design drawings are rounded)) is needed, a mixture of two or more kinds of the aromatic vinyl compound-conjugate diene compound block copolymers can be used. In that case, preferred is a mixture of 95 to 5% by weight of a hydrogenated block copolymer (i) having a high hydrogenation ratio in which 90% or more of the conjugate diene block is hydrogenated and 5 to 95% by weight of a hydrogenated block copolymer (ii) having a low hydrogenation ratio in which 50% to less than 90% of the conjugate diene block is hydrogenated.

Specific examples of the above hydrogenated block copolymer having a high hydrogenation ratio of the component (i) include styrene-ethylene•butene-styrene copolymers (SEBS), styrene-ethylene•propylene-styrene copolymers (SEPS), styrene-ethylene•ethylene-propylene-styrene copolymers (SEEPS), and the like. Specific examples of the above hydrogenated block copolymer having a low hydrogenation ratio of the component (ii) include partially hydrogenated styrene-butadiene-styrene copolymers (SBBS) in which the 1,2-bond of the butadiene block is selectively hydrogenated, and the like. In addition, partially hydrogenated styrene-isoprene-styrene copolymers, partially hydrogenated styrene-isoprene•butadiene-styrene copolymers, and the like are also included.

With regard to the blending ratio of (i) to (ii), the component (i) is preferably from 95 to 5% by weight, more preferably from 85 to 50% by weight. On the other hand, the component (ii) is preferably from 5 to 95% by weight, more preferably from 15 to 50% by weight.

The moldability is improved by blending the components (i) and (ii) in the above ratio. Particularly, in extrusion molding, there is obtained an advantage that appearance of products hardly deteriorated even when production volumes increase.

Examples of the hydrogenated product of the above conjugate diene block copolymer include block copolymers having crystalline ethylene block and amorphous ethylene-butene block (CEBC) obtained by hydrogenation of block copolymers of butadiene, and the like. In the invention, the hydrogenated products of conjugate diene compound block copolymers may be used solely or as a mixture of two or more of them.

Moreover, the weight average molecular weight of the hydrogenated product of the above conjugate diene block copolymer is preferably 150,000 or less, more preferably from 30,000 to 120,000. When the weight average molecular weight exceeds 150,000, moldability becomes worse.

(b) Organic Peroxide:

The organic peroxide (b) component to be used in the thermoplastic elastomer composition of the invention exhibits a function to generate radicals and to crosslink the component (a) and simultaneously graft-polymerize the component (c) to the component (a) by chain reaction of the radicals, whereby it exhibits a function to improve compatibility with the polar group-containing resin.

Examples of the component (b) include dicumyl peroxide, di-tert-butyl peroxide, 2,5-dimethyl-2,5-di(tert-butylperoxy) hexane, 2,5-dimethyl-2,5-di(tert-butylperoxy)hexyne-3, 1,3-bis(tert-butylperoxyisopropyl)benzene, 1,1-bis(tert-butylperoxy)-3,3,5-trimethylcyclohexane, 1,1-bis(t-hexylperoxy)-3,3,5-trimethylcyclohexane, n-butyl-4,4,-bis(tert-butylperoxy)valerate, benzoylperoxide, p-chlorobenzoyl peroxide, 2,4-dichlorobenzoyl peroxide, tert-butylperoxy benzoate, tert-butylperoxyisopropyl carbonate, diacetyl peroxide, lauroyl peroxide, tert-butylcumyl peroxide, and the like. Among those, particularly preferred are 2,5-dimethyl-2, 5-di(tert-butylperoxy)hexane, 2,5-dimethyl-2,5-di(tert-butylperoxy)hexyne-3, and 1,1-bis(t-hexylperoxy)-3,3,5-trimethylcyclohexane in view of smell, coloring and scorch stability.

The blending amount of the component (b) is 0.01 to 3 parts by weight, preferably 0.05 to 1.5 parts by weight per 100 parts by weight of the component (a). When the blending amount is less than 0.01 part by weight, the graft polymerization of the component (c) to the component (a) cannot be sufficiently achieved and stickiness becomes worse as well as sufficient crosslinking cannot be achieved and heat resistance and oil resistance of the resulting thermoplastic elastomer composition become worse. Moreover, since introduction of the component (c) to the resulting thermoplastic elastomer composition by graft polymerization is insufficient, moldability becomes worse owing to bad compatibility of an alloyed product with the resin having a polar group. On the other hand, when the amount exceeds 3.0 parts by weight, mechanical properties of the resulting thermoplastic elastomer composition, stickiness of molded articles, and moldability become worse, and hence moldability of an alloyed product of the resulting thermoplastic elastomer composition and the resin having a polar group becomes worse.

(c) Carboxylated Liquid Polybutadiene:

The carboxylated liquid polybutadiene (c) component to be used in the thermoplastic elastomer composition of the invention mainly plays a function to improve compatibility with the resin having a polar group through graft-polymerization to the component (a) in the presence of the organic peroxide at the melting treatment of the elastomer composition. The liquid polybutadiene containing maleic anhydride or a terminal hydroxyl group as in the conventional art has problems of gas generation, bubble entrainment into molded articles, and the like under severe molding conditions and the problems are solved by use of the component (c) in the invention.

The component (c) is a liquid polymer transparent at room temperature, wherein the microstructure in the main chain in polybutadiene comprises a vinyl-1,2-bond type, a trans-1,4-bond type, or a cis-1,4-bond type. In the structure, the vinyl-1,2-bond is preferably 30% by weight or less and, when the vinyl-1,2-bond exceeds 30% by weight, flexibility and moldability of the resulting thermoplastic elastomer composition become worse and also flexibility and moldability of the alloyed product becomes worse, so that the case is not preferable. Moreover, the cis-1,4-bond is preferably 40% by weight or more and, when the cis-1,4-bond is less than 40% by weight, flexibility and moldability of the resulting thermoplastic elastomer composition become worse and also flexibility, thermal resistance, and moldability of the alloyed product become worse, so that the case is not preferable.

The carboxylated liquid polybutadiene (c) component is obtained by reacting a liquid polybutadiene with a carboxyl group-introducing compound and the ratio of 1,3-butadiene constituting the liquid polybutadiene to the carboxyl group-introducing compound is preferably 80 to 98% by weight of 1,3-butadiene and 2 to 20% by weight of the carboxyl group-introducing compound.

The liquid polybutadiene to be used in the reaction preferably has a number average molecular weight of 500 to 10,000, more preferably 1,000 to 7,000, and the molecular weight distribution is desirably broad. Moreover, the liquid polybutadiene more preferably has an iodine value of 30 to 500 g-iodine/100 g-substance which is measured in accordance with DIN 53241. Furthermore, the liquid polybutadiene preferably has a molecular structure having a cis-double bond of 70 to 90%, a trans-double bond of 10 to 30%, and a vinyl double bond of 0 to 3%.

As the carboxyl group-introducing compound, an ethylenically unsaturated dicarboxy compound, for example, an ethylenically unsaturated dicarboxylic acid or an anhydride or monoester thereof can be used. Specific compounds thereof include maleic acid, fumaric acid, itaconic acid, 3,6-tetrahydrophthalic acid, itaconic anhydride, 1,2-dimethylmaleic anhydride, maleic acid monomethyl ester, maleic monoethyl ester, and the like. Among them, maleic anhydride is preferred for the reasons of economical efficiency and reactivity.

The production of the polybutadiene/maleic anhydride-adduct comprising polybutadiene and maleic anhydride can be carried out by a known method.

Moreover, the acid value of the maleylated liquid polybutadiene in accordance with DIN ISO 3682 is preferably from 50 to 120 (mgKOH/g), more preferably 70 to 90 (mgKOH/g). When the acid value is less than 50 (mgKOH/g), compatibility of the resulting thermoplastic elastomer composition with the polar group-containing resin decreases and, when it exceeds 120 (mgKOH/g), thermal deformation resistance of the resulting thermoplastic elastomer composition and thermoplastic resin composition decreases.

Furthermore, the maleylation ratio of the maleylated liquid polybutadiene is preferably from 6 to 20%, more preferably from 6 to 15%, further preferably from 7 to 10% although the ratio may vary with viscosity thereof.

Moreover, the viscosity (20° C.) of the maleylated liquid polybutadiene measured in accordance with DIN 53214 is preferably from 3 to 16 Pa·s, more preferably from 5 to 13 Pa·s, further preferably from 6 to 9 Pa·s.

Furthermore, the vinyl-double bond of the maleylated liquid polybutadiene accounts for 30% or less and the compound having a cis-double bond in the above range has a higher flexibility as compared with the liquid polybutadiene having a cis-double bond of less than the above lower limit and has a high maleylation ratio (acid value) as mentioned above. Therefore, the resulting thermoplastic elastomer composition is rich in flexibility and has a sufficient polarity, so that an alloyed product thereof with the resin having a polar group can be made more flexible, permits easy adjustment of its flexibility, and also is excellent in compatibility.

The liquid polybutadiene having a cis-double bond of less than the above lower limit results in a rapid increase of the viscosity together with increase of the maleylation ratio but the compound having a cis-double bond in the above range results in small viscosity increase. Since the viscosity is low as shown in the above range, the reactivity is enhanced and a graft ratio to the component (a) increases. Moreover, since gas generation is less during the molding of the alloyed product of the resulting thermoplastic elastomer composition with the resin having a polar group, working environment is good and bubbles are not generated inside the molded articles. In addition, handling is also easy at the production of the thermoplastic elastomer composition.

Examples of commercial products of the maleylated liquid polybutadiene include POLYVEST OC 800S (registered trademark), 1200S manufactured by Degusa.

The blending amount of the component (c) is from 1 to 80 parts by weight, preferably from 5 to 60 parts by weight per 100 parts by weight of the component (a). When the blending amount exceeds 80 parts by weight, stickiness of the resulting thermoplastic elastomer composition becomes remarkable, thermal deformation resistance decreases, gas generates during the molding, draw down becomes remarkable, and release ability becomes worse. Moreover, also in the alloyed product, stickiness by bleeding becomes remarkable, thermal deformation resistance decreases, gas generates during the molding, draw down becomes remarkable, and release ability becomes worse. When the blending amount is less than 1 part by weight, in the alloyed product, peeling, deformation, and flow mark are apt to occur in the molded articles.

(d) Rubber Softener:

In the thermoplastic elastomer composition of the invention, if necessary, a rubber softener (d) component can be used. The component (d) may be a non-aromatic rubber softener component or an aromatic rubber softener component. In addition, an ester-based plasticizer may be also used and particularly, a non-aromatic mineral oil and an ester-based plasticizer are preferred.

The above non-aromatic mineral oil softener includes paraffin-based softeners where the number of paraffin chain carbons accounts for 50% or more of total carbon number, particularly non-aromatic mineral oils or liquid or low-molecular-weight synthetic softeners. The mineral oil softener to be used for rubbers is a mixture wherein three components, i.e., an aromatic ring, a naphthene ring, and a paraffin chain are combined. The mineral oil softeners are classified into paraffin-based ones in case that the number of paraffin chain carbons accounts for 50% or more of the total carbon number, naphthene-based ones in case that the number of naphthene ring carbons accounts for 30 to 40% thereof, and aromatic ones in case that the number of aromatic carbons accounts for 30% or more.

The mineral oil-based rubber softener to be used as the non-aromatic rubber softener of the invention is the paraffin-based one or the naphthene-based one in the above classification. As the non-aromatic rubber softeners of the invention, the paraffin-based ones are preferred. Furthermore, among the paraffin-based ones, those containing a small amount of the aromatic ring component are particularly suitable. Moreover, the liquid or low-molecular-weight synthetic softeners include polybutene, hydrogenated polybutene, low-molecular-weight polyisobutylene, and the like.

With regard to the properties of these non-aromatic rubber softeners, it is preferable to have a kinetic viscosity at 37.8° C. of 20 to 50,000 cSt, preferably 20 to 1,000 cSt, a kinetic viscosity at 100° C. of 5 to 1,500 cSt, preferably 5 to 100 cSt, a pour point of −10 to −25° C., and a flash point (COC) of 170 to 350° C. Furthermore, the weight average molecular weight thereof is preferably from 100 to 2,000.

Among them, as generally available non-aromatic rubber softeners, there may be mentioned aliphatic paraffin oils such as PW-90 and PW-380 manufactured by Idemitsu Kosan Co., Ltd.

Among the above ester-based plasticizers, examples of cyclic plasticizers include esters of phthalic anhydride and trimellitic esters, and furthermore, N-cyclohexyl-p-toluenesulfonamide, dibenzyl sebacate, diethylene glycol dibenzoate, di-t-octylphenyl ether, dipropanediol dibenzoate, N-ethyl-p-toluenesulfonamide, isopropylidenediphenoxypropanol, alkylated naphthalene, polyethylene glycol dibenzoate, o,p-toluenesulfonamide, trimethylpentanediol dibenzoate, trimethylpentanediol monoisobutyrate monobenzoate, and the like. Among them, esters of phthalic anhydride and trimellitic esters are preferred.

Examples of the esters of phthalic anhydride include butyl octyl phthalate, butyl 2-ethylhexyl phthalate, butyl n-octyl phthalate, dibutyl phthalate, diethyl phthalate, diisodecyl phthalate, dimethyl phthalate, dioctyl phthalate, di(2-ethylhexyl)phthalate, diisooctyl phthalate, diisononyl phthalate (DINP), di-tridecyl phthalate, n-hexyl n-decyl phthalate, n-octyl n-decyl phthalate, alkyl benzyl phthalate, bis(4-methyl-1,2-pentyl)phthalate, butyl benzyl phthalate, butyl cyclohexyl phthalate, di(2-butoxyethyl)phthalate, cyclohexyl isodecyl phthalate, dicyclohexyl phthalate, diethyl isophthalate, di-n-heptyl phthalate, dihexyl phthalate, di(2-methoxyethyl)phthalate, dimethyl isophthalate, dinonyl phthalate, dioctyl isophthalate, dicapryl phthalate, di(2-ethylhexyl)isophthalate, mixed dioctyl phthalate, diphenyl phthalate, 2-(ethylhexyl)isobutyl phthalate, butyl phthalylbutyl glycolate, ethyl (and methyl) phthalylethyl glycolate, polypropylene glycol bis(amyl) phthalate, hexyl isodecyl phthalate, isodecyl tridecyl phthalate, isooctyl isodecyl phthalate, and the like.

Representative examples of the trimellitic esters include triisooctyl trimellitate, tri-n-octyl n-decyltrimellitate, trioctyl trimellitate, tri (2-ethylhexyl)trimellitate (TOTM), tri-n-hexyl n-decyltrimellitate, tri-n-hexyl trimellitate, triisodecyl trimellitate, triisononyl trimellitate, and the like.

Moreover, examples of non-cyclic plasticizers include phosphoric esters, adipic esters, azelaic esters, citric esters, acetylcitric esters, myristic esters, ricinoleic esters, acetylricinoleic esters, sebacic esters, stearic esters, epoxydated esters, and further, 1,4-butanediol dicaprylate, butoxyethyl pelargonate•di[(butoxyethoxy)ethoxy]methane, dibutyl tartrate, diethylene glycol dipelargonate, diisooctyl diglycolate, isodecyl nonanoate, tetraethylene glycol di(2-ethyl-butyrate), triethylene glycol di(2-ethyl-hexanoate), triethylene glycol dipelargonate, ester compounds of branched aliphatic dihydric alcohols such as 2,2,4-trimethyl-1,3-pentanediol monobutylate and 2,2,4-trimethyl-1,3-pentanediol diisobutyrate (TXIB), acrylic polymers, and the like.

Representative examples of the phosphoric esters include cresyl diphenyl phosphate, tricresyl phosphate, dibutyl phenyl phosphate, diphenyl octyl phosphate, methyl diphenyl phosphate, tributyl phosphate, triphenyl phosphate, tri(2-butoxyethyl)phosphate, tri(2-chloroethyl)phosphate, tri(2-chloropropyl)phosphate, and trioctyl phosphate.

Representative examples of the adipic esters include di[2-(2-butoxyethoxy)ethyl]adipate, di(2-ethylhexyl)adipate, diisononyl adipate (DINA), diisodecyl adipate, dioctyl adipate (inclusive of diisooctyl adipate), n-hexyl n-decyl adipate, n-octyl n-decyl adipate, and di-n-heptyl adipate.

Representative examples of the sebacic esters include dibutyl sebacate, di(2-ethylhexyl)sebacate, dibutoxyethyl sebacate, diisooctyl sebacate, and diisopropyl sebacate.

Representative examples of the azelaic esters include di(2-ethylhexyl)azelate, dicyclohexyl azelate, diisobutyl azelate, and diisooctyl azelate.

The acrylic polymer plasticizers include polymers comprising reaction products each obtained by reacting mixtures of (i) a radically polymerizable monomer and (ii) a compound for modification in the presence or absence of a polymerization initiator. The polymers are preferably polymers where the bonding mode of the compound for modification (ii) to the polymers is an ester bond and may be polymers using (meth) acrylic acid as the radically polymerizable monomer (i) and an aliphatic or alicyclic alcohol as the compound for modification (ii).

In the acrylic polymer plasticizers, examples of the radically polymerizable monomer (i) include (meth)acrylic acid; alkyl (meth)acrylates such as methyl (meth)acrylate, ethyl (meth)acrylate, butyl (meth)acrylate, and 2-ethylhexyl (meth)acrylate; (meth)acrylates containing a hydroxyl group such as 2-hydroxyethyl (meth)acrylate and hydroxypropyl (meth)acrylate; maleic anhydride, maleic acid, and mono- and di-alkyl esters of maleic acid; aromatic vinyl monomers such as styrene and α-methylstyrene; vinyl esters such as vinyl acetate and vinyl propionate; alkenes such as ethylene and propylene; (meth)acrylonitrile, (meth)acrylamide, vinyl chloride, vinylidene chloride, allyl chloride, and allyl alcohol, and the like.

Moreover, examples of the compound for modification (ii) include cycloalkanols such as cyclohexyl alcohol; alkanols such as isopropyl alcohol; halogen-containing alcohols such as fluoroalkyl alcohols; alkylene diols such as ethylene glycol and butanediol; cycloalkylenediols such as cyclohexanediol and cyclohexyldimethanol; hydroxyl group-containing modifiers, e.g., polymers such as polyethers and polyesters containing a hydroxyl group at the terminal, carboxyl group-containing compounds such as cyclohexylcarboxylic acid, cyclohexyldicarboxylic acid, adipic acid, sebacic acid, fluoroalkyldicarboxylic acid, maleic anhydride, and fumaric acid; ester group-containing modifiers such as ethyl acetate, butyl acetate, cellosolve acetate, methylpropylene glycol acetate, carbitol acetate, and ethylcarbitol acetate, alkenes such as cyclohexene, cyclopentene, and isobutene.

As an example of the acrylic polymer in the combination of the above (i) and (ii), there is obtained a polymer where a compound for modification is introduced into the polymer by an esterification reaction using a monoalkyl ester such as (meth)acrylic acid, maleic anhydride, maleic acid, or a monoalkyl ester of maleic acid as (i) and a compound containing a hydroxyl group as (ii). When an ester group-containing monomer such as methyl (meth)acrylate, ethyl acrylate, butyl acrylate, or 2-ethylhexyl acrylate as (i) and a compound having a hydroxyl group as (ii) are used, a functional polymer is obtained by an ester-exchange reaction. Moreover, by forming an ester bond by the reaction of a hydroxyl group-containing monomer such as 2-hydroxyethyl (meth)acrylate or hydroxypropyl (meth)acrylate as (i) with a carboxyl group or ester group-containing compound as (ii), a polymer into which a functional group is introduced is obtained. Furthermore, by use of a carboxyl group-containing monomer such as (meth)acrylic acid as (i) and an alkene as (ii), the carboxyl group is added to the ethylenically unsaturated bond to form an ester bond, whereby a polymer into which a compound for modification is introduced is obtained.

In the acrylic polymer plasticizer to be used in the invention, as the above (i), butyl acrylate, ethyl acrylate, hexyl acrylate, methoxyethyl acryalte, and glycidyl acrylate are preferred, and particularly, it is most suitable that ethyl acrylate is a main component.

Moreover, the weight average molecular weight (Mw) of the acrylic polymer plasticizer is preferably from 500 to 10,000, more preferably from 1,000 to 6,000, further preferably from 1,000 to 3,000. The viscosity thereof is preferably from 100 to 9,000 mPa·s, more preferably from 1,000 to 6,000 mPa·s, further preferably from 3,000 to 5,000 mPa·s. The SP value determined from acetone-water tolerance is preferably from 10.5 to 16.5, more preferably from 13 to 16, further preferably from 14 to 16.

Among these ester-based compound plasticizers, DINP, DINA, and TOTM are particularly preferred.

The blending amount of the component (d) is from 1 to 350 parts by weight, preferably from 5 to 25 parts by weight per 100 parts by weight of the component (a). When the blending amount exceeds 350 parts by weight, the softener tends to bleed out of the resulting thermoplastic elastomer composition and peeling, deformation, and flow mark are apt to occur in the molded articles. Furthermore, gas generation becomes remarkable during the processing. Moreover, in alloyed products, bleeding is apt to occur.

(e) Ester-Based Crosslinking Aid:

In the thermoplastic elastomer composition of the invention, an ester-based crosslinking aid (e) component can be used, if necessary. The component (e) can be blended at the crosslinking of the thermoplastic elastomer composition of the invention with the above organic peroxide (b), whereby a homogeneous and efficient crosslinking reaction can be achieved.

Specific examples of the component (e) include triallyl cyanurate, polyfunctional methacrylate compounds such as ethylene glycol dimethacrylate, diethylene glycol dimethacrylate, triethylene glycol dimethacrylate, tetraethylene glycol dimethacrylate, polyethylene glycol dimethacrylate having 9 to 14 repeating units of ethylene glycol, trimethylolpropane trimethacrylate, allyl methacrylate, 2-methyl-1,8-octanediol dimethacrylate, and 1,9-nonanediol dimethacrylate, polyfunctional acrylate compounds such as polyethylene glycol diacrylate, 1,6-hexanediol diacrylate, trimethylolpropnane tetraacrylate, dipentaerythritol polyacrylate, neopentyl glycol diacrylate, and propylene glycol diacrylate, and polyfunctional vinyl compounds such as vinyl butyrate and vinyl stearate. They may be used solely or as a mixture of two or more of them. Among these crosslinking aids, triethylene glycol dimethacrylate, tetraethylene glycol dimethacrylate, trimethylolpropane trimethacrylate, trimethylolpropnane tetraacrylate, and dipentaerythritol polyacrylate are particularly preferred.

The blending amount of the component (e), when blended, is preferably from 0.02 to 10 parts by weight, more preferably from 0.1 to 3 parts by weight per 100 parts by weight of the component (a). When the blending amount exceeds 10 parts by weight, owing to the self-polymerizability, a degree of crosslinking decreases and hence the aimed effect is not achieved.

(f) Isobutylene-Based Block Copolymer:

In the thermoplastic elastomer composition in the invention, if necessary, an isobutylene-based block copolymer (f) component can be used. The (f) component is an isobutylene-based block copolymer comprising an isobutylene-based block and an aromatic vinyl-based polymer block and is excellent in compatibility with the resin having a polar group to be used in the thermoplastic resin composition of the invention. By adding the (f) component, moldability and flexibility can be improved without decreasing compatibility with the resin having a polar group.

As the isobutylene-based block copolymer to be used in the invention, those having any structures can be used as far as they have a unit mainly comprising isobutylene and a unit mainly comprising an aromatic vinyl compound. However, in view of a balance between physical properties and convenience of synthesis, a triblock having a structure of (a unit mainly comprising an aromatic vinyl compound—a unit mainly comprising isobutylene—a unit mainly comprising an aromatic vinyl compound), a diblock having a structure of (a unit mainly comprising isobutylene—a unit mainly comprising an aromatic vinyl compound), or a mixture thereof may be used. The ratio of the unit mainly comprising isobutylene to the unit mainly comprising an aromatic vinyl compound is not particularly limited but, in view of a balance of physical properties, 95 to 20 parts by weight of the unit mainly comprising isobutylene and 5 to 80 parts by weight of the unit mainly comprising an aromatic vinyl compound are preferred, and 90 to 60 parts by weight of the unit mainly comprising isobutylene and 10 to 40 parts by weight of the unit mainly comprising an aromatic vinyl compound are further preferred.

The number average molecular weight of the isobutylene-based block copolymer is not particularly limited but is preferably from 30,000 to 500,000, particularly preferably from 50,000 to 400,000. When the number average molecular weight is less than 30,000, mechanical properties decrease and, when it exceeds 500,000, moldability becomes worse.

Examples of the aromatic vinyl compound to be used in the above aromatic vinyl-based polymer block include styrene, α-methylstyrene, β-methylstyrene, p-methylstyrene, t-butylstyrene, monochlorostyrene, dichlorostyrene, methoxystyrene, indene, and the like. Among the above compounds, in view of a balance of cost, physical properties, and productivity, styrene, α-methylstyrene, p-methylstyrene, and indene are preferred and two or more compounds may be selected among them.

Specific examples of the isobutylene-based block copolymer include 103T (weight average molecular weight=100,000), 073T (weight average molecular weight=65,000), and the like manufactured by Kanegafuchi Chemical Ind. Co., Ltd.

The blending amount of the component (f), when blended, is preferably from 1 to 500 parts by weight, more preferably 50 to 500 parts by weight per 100 parts by weight of the component (a). When the blending amount exceeds 500 parts by weight, stickiness of the resulting thermoplastic elastomer composition becomes remarkable, thermal deformation resistance decreases, draw down becomes remarkable, and releasing ability becomes worse.

(g) Inorganic Filler:

In the thermoplastic elastomer composition of the invention, if necessary, an inorganic filler (g) component can be blended. The component (g) has an effect to improve part of physical properties such as compression set of the molded articles obtained from the thermoplastic elastomer composition and the thermoplastic resin composition and also an economical advantage due to weight increase. Examples of the component (g) include wollastonite, chlorite, calcium carbonate, talc, silica, diatomaceous earth, barium sulfate, magnesium carbonate, magnesium hydroxide, mica, clay, titanium oxide, carbon black, glass fiber, hollow glass balloon, carbon fiber, calcium titanate fiber, natural silicic acid, synthetic silicic acid (white carbon), and the like. Among them, calcium carbonate, wollastonite, chlorite, and talc are particularly preferred.

The blending amount of the component (g), when blended, is preferably from 1 to 200 parts by weight, more preferably 1 to 100 parts by weight per 100 parts by weight of the component (a). When the blending amount exceeds 200 parts by weight, mechanical strength of the resulting thermoplastic elastomer composition remarkably decreases and hardness increases to result in loss of flexibility, so that a product having rubbery touch is not obtained.

(h) Other Components:

In the thermoplastic elastomer composition of the invention, within the range where the object of the invention is not impaired, use can be made of various antioxidants of phosphorus types, phenol-types, or sulfur-types, various weathering agents such as antiaging agents, light stabilizers, and UV absorbers, copper inhibitors; various lubricants such as modified silicone oils, silicone oils, waxes, acid amides, fatty acids, and fatty acid metal salts, various nucleating agents such as aromatic phosphoric metal salt-types and gelol-types, various plasticizers such as glycerin fatty acid esters, additives such as various colorants, and the like. In order to prevent troubles such as bleeding-out onto the surface of molded articles, it is preferred to use those having a high compatibility with the thermoplastic elastomer composition of the invention.

2. Production of Thermoplastic Elastomer Composition

The thermoplastic elastomer composition of the invention can be produced by adding the above components (a) to (c) and, if necessary, the components (d) to (h) simultaneously or in any order and melt-kneading them.

The method for the melt-kneading is not particularly limited and use can be made of usual known methods. For example, single-screw extruders, twin-screw extruders, rolls, Banbury mixers, or various kneaders can be used. For example, the above operations can be conducted continuously by using a twin-screw extruder having an appropriate L/D, a Banbury mixer, or a pressure kneader, or the like. In this process, the temperature for the melt-kneading is preferably from 160 to 220° C.

The thermoplastic elastomer composition of the invention is rich in flexibility, excellent in thermal deformation resistance and moldability, excellent in compatibility with a resin having a polar group, and capable of softening the resin having a polar group due to the excellent flexibility, so that it can be used as various molding materials and the like, particularly as modifiers for polar group-containing resins.

3. Thermoplastic Resin Composition

The thermoplastic resin composition of the invention is a composition containing the thermoplastic elastomer composition obtained in the above and the resin having a polar group. The compatibility of the thermoplastic elastomer composition with the resin having a polar group is satisfactory and, as a result, the composition is rich in flexibility, excellent in bleeding resistance, and also less in gas generation and entrainment of bubbles into molded articles during the molding.

The resin having a polar group usable in the invention is not particularly limited as far as it is a thermoplastic resin, elastomer, or rubber having a polar group. Examples thereof include polyester-based resins such as polyethylene terephthalate (PET), polybutylene terephthalate (PBT), polyethylene naphthalate (PEN), polycyclohexylenedimethylene terephthalate (PCT), and glycol-modified PET (PETG), polyamide-based resins (PA), polycarbonate (PC), resins each mainly comprising a copolymer of ethylene with a monomer containing a vinyl group, nitrile-butadiene rubbers (NBR), partially crosslinked nitrile-butadiene rubbers, polyurethane-based thermoplastic elastomers (TPU), polyester-based thermoplastic elastomers (COPE), polyamide-based thermoplastic elastomers (COAE), polyacetals (POM), biodegradable polyester based resins, acryl rubbers, and the like. These resins and rubbers may be used solely or as a mixture of two or more of them.

Among them, particularly, polyurethane-based thermoplastic elastomers (TPU), polyester-based thermoplastic elastomers (COPE), polyamide-based resins (PA), polyamide-based thermoplastic elastomers (COAE), ionomers, resins each mainly comprising a copolymer of ethylene with a monomer containing a vinyl group, nitrile-butadiene rubbers (NBR), and polyacetals (POM) are preferred.

With regard to the composition ratio of the thermoplastic elastomer composition to the resin having a polar group in the thermoplastic resin composition of the invention, the thermoplastic elastomer composition accounts for from 5 to 75% by weight, preferably from 10 to 65% by weight and the resin having a polar group accounts for from 95 to 25% by weight, preferably 85 to 35% by weight. When the thermoplastic elastomer composition accounts for less than 5% by weight (the resin having a polar group accounts for more than 95% by weight), flexibility is not exhibited and moldability is not improved. When the thermoplastic elastomer composition accounts for more than 75% by weight (the resin having a polar group accounts for less than 25% by weight), mechanical properties are insufficient.

4. Process for Producing Thermoplastic Resin Composition

The thermoplastic resin composition of the invention can be produced in the same manner as in the case of the production of the above thermoplastic elastomer composition. Namely, it can be produced by adding the thermoplastic elastomer composition, the resin having a polar group, and, if necessary, optional component(s) such as an antioxidant used in the above thermoplastic elastomer composition and melt-kneading them.

The method for the melt-kneading is not particularly limited and use can be made of a usual known method. For example, single-screw extruders, twin-screw extruders, rolls, Banbury mixers, or various kneaders can be used. For example, the above operations can be conducted continuously by using a twin-screw extruder having an appropriate L/D, a Banbury mixer, or a pressure kneader, or the like. In this process, the temperature for the melt-kneading is preferably from 160 to 250° C., although it may vary depending on the resin used.

The alloyed product as the thermoplastic resin composition of the invention is rich in flexibility, excellent in bleeding resistance, also less in gas generation and entrainment of bubbles into molded articles during the molding, and excellent in thermal deformation resistance and moldability, particularly excellent in oil resistance, abrasion resistance, mechanical properties at a high temperature, so that it can be used particularly in electric wires•electric parts, industrial machine parts, medical equipment parts, food-related parts, automobile parts, building materials, and the like.

Specifically, examples of the electric wires•electric parts include connectors, switch covers, plugs, gaskets, grommets, cable jacket, curl codes, wire insulating covers, and the like; examples of the industrial machine parts include pressure hoses, diaphragms, gaskets, packing, casters, grommets, roller coupling grips, hoses, and the like; examples of the medical equipment parts and food-related parts include syringe chips, stoppers, grommets, caps for blood-collecting tubes, cap seals, and the like; examples of the automobile parts include CVJ boots, rack-and-pinion boots, shock absorber dust boots, vacuum connectors, air ducts, tubes, run channels, grommets, handle covers, air bag outer cover steering, mud guards, and the like; and examples of the building materials include window frame seals, expansion joints, sponge seals, banister covers, stir antislips, and the like. In addition, examples of the other applications include materials for grips such as pen grips, bicycle grips, and toothbrush grips, toy parts, mats, goggles, antidust•gas masks, shoe soles, and the like.

EXAMPLES

The present invention will be illustrated in greater detail with reference to the following Examples and Comparative Examples, but the invention should not be construed as being limited thereto. In this connection, the methods for measuring physical properties and the samples used are as follows.

1. Test Methods (1) Specific Gravity:

Measurement was conducted using a gel-form or solid sample as a test piece in accordance with JIS K 7112.

(2) Hardness:

Durometer hardness type A (noted as "A" after figures in Tables) or type D (noted as "D" after figures in Tables) was measured in accordance with JIS K 6253. A press sheet having a thickness of 6.3 mm was used as a test piece.

(3) Tensile Strength:

Measurement was conducted in accordance with JIS K 6251 and a test piece obtained by punching out a press sheet having a thickness of 1 mm into a No. 3 dumbbell-type test piece. A tensile rate was 500 mm/minute (measured at room temperature).

(4) 100% Modulus:

Measurement was conducted in accordance with JIS K 6251 and a test piece obtained by punching out a press sheet having a thickness of 1 mm into a No. 3 dumbbell-type test piece. A tensile rate was 500 mm/minute.

(5) Elongation:

Measurement was conducted in accordance with JIS K 6251 and a test piece obtained by punching out a press sheet having a thickness of 1 mm into a No. 3 dumbbell-type test piece. A tensile rate was 500 mm/minute.

(6) Gas Generation During Molding:

Gas generated at the time when purged at a nozzle temperature of 220° C. in an injection molding machine with a mold clamping force of 50 t was observed without wearing mask and protective glasses and evaluated according to the following criteria:

A: A slight gas generation is observed but no sense of discomfort at the eyes and throat is felt.

B: Much gas generates and the eyes and throat become sore.

(7) Stickiness of Molded Article:

A sheet having a size of 50 mm×88 mm×3 mm molded in a 50 t injection molding machine was visually observed and evaluated according to the following criteria:

A: Stickiness to such extent that sheets adhere to each other is not observed even when a sheet is placed on another sheet.

B: Sheets adhere to each other or stickiness is felt when the sheet is touched with a finger.

(8) Injection Moldability:

A sheet having a size of 13.5 mm×13.5 mm×2 mm was molded under conditions of a molding temperature of 220° C., a mold temperature of 40° C., an injection rate of 55 mm/second, an injection pressure of 600 kg/cm$^2$, a dwell pressure of 400 kg/cm$^2$, an injection time of 6 seconds, and a cooling time of 45 seconds using an injection molding machine with a mold clamping force of 120 t. The presence of delamination, surface layer peeling, deformation, and flow mark remarkably degrading appearance was visually judged to evaluate the sheet according to the following criteria:

A: Good

B: Bad (9) Extrusion Moldability:

A sheet having a size of 50 mm×1 mm was molded by extrusion and a draw down property, surface appearance, and shape were observed to evaluate the sheet according to the following criteria:

A: Good

B: Bad

(10) Bleeding Resistance:

An extruded sheet folded and fixed with a clip was allowed to stand in an atmosphere of room temperature and 110° C. for 168 hours. The presence of bleeding of low-molecular-weight substances and blooming were visually observed to evaluate the sheet according to the following criteria:

A: Good

B: Bad

(11) Thermal Resistance (Compression Set):

Measurement was conducted in accordance with JIS K 6262 and a press sheet having a thickness of 6.3 mm was used as a test piece. The sheet was measured under a condition of 25% deformation at 70° C. for 72 hours and evaluated according to the following criteria:

A: less than 50%

B: 50% or more

(12) Oil Resistance (Volume Change Ratio):

Measurement was conducted in accordance with JIS K 6258 and a test piece obtained by punching out a press sheet having a thickness of 1 mm into a No. 3 type by dumbbell was used. A volume change at 70° C. for 72 hours was measured using IRM#902 oil and the sample was evaluated according to the following criteria:

A: less than 100%

B: 100% or more

(13) Hydrogenation Ratio of Conjugate Diene Block Part:

A sample was placed in an NMR sample tube (5 mmφ) and, after the addition of deuterated chloroform, was thoroughly dissolved therein. $^1$H-NMR measurement was conducted at room temperature at 400 MHz with 3029 times integration using a GSX-400 Model nuclear magnetic resonance apparatus manufactured by JOEL to determine a hydrogenation ratio.

2. Samples used in Examples and Comparative Examples (1) Hydrogenated Block Copolymer (a-1):

Septon 4077 (SEPS; manufactured by Kuraray Co., Ltd.), styrene content: 30% by weight, number average molecular weight: 260,000, weight average molecular weight: 320,000, molecular weight distribution: 1.23, hydrogenation ratio: 90% or more.

(2) Hydrogenated Block Copolymer (a-2):

Tuftec P series JT90C (SBBS; manufactured by Asahi Kasei Corporation), styrene content: 30% by weight, number average molecular weight: 99,000, weight average molecular weight: 110,000, molecular weight distribution: 1.11, hydrogenation ratio of butadiene block: 75.1% (hydrogenation ratio of 1,2-butadiene: 92.7%, hydrogenation ratio of 1,4-butadiene: 61.0%).

(3) Hydrogenated Block Copolymer (a-3):

Kraton 1652 (SEBS) (registered trademark; manufactured by Kraton Polymer Japan), styrene content: 29% by weight, number average molecular weight: 90,000, weight average molecular weight: 120,000, molecular weight distribution: 1.33, hydrogenation ratio: 90% or more.

(4) Hydrogenated Block Copolymer (a-4):

Dynaron DR6210B (CEBC) (registered trademark; manufactured by JSR Corporation), styrene content: 0% by weight, number average molecular weight: 180,000, weight average molecular weight: 230,000, molecular weight distribution: 1.27, hydrogenation ratio: 90% or more.

(5) Organic Peroxide (b):

Perhexa 25B (2,5-dimethyl-2,5-di(tert-butylperoxy)hexane; manufactured by NOF Corporation).

(6) Carboxylated Liquid Polybutadiene (c):

maleylated liquid polybutadiene (product name: POLYVEST OC-800S (manufactured by Degusa)) 1,4-cis-double bond in polybutadiene: 75%, 1,4-trans-double bond: 24%, vinyl bond: 1%, maleylation ratio: 7.5%, number average molecular weight: 3300 (GPC), weight average molecular weight: 13,600 (GPC), viscosity (20° C.): 6 to 9 Pa·s (measured according to DIN 53214), acid value: 70 to 90 mgKOH/g, iodine value: 380 to 420 g/100 g, (polymerized with a Ziegler-Natta catalyst)

(7) Comparative Component-1 of Component (c):
Epoxydated liquid polybutadiene (product name: E-1000-8 (manufactured by Nippon Petrochemicals Co., Ltd.)) vinyl bond: 56-61%, trans bond: 15-17%

(8) Comparative Component-2 of Component (c):
Methacrylated liquid polybutadiene (product name: MM-1000-80 (manufactured by Nippon Petrochemicals Co., Ltd.)) vinyl bond: 56-61%, trans bond: 15-17%

(9) Comparative Component-3 of Component (c):
Hydroxyl group-containing liquid polybutadiene (product name: G-2000 (manufactured by Nippon Soda Co., Ltd.)) 1,2-vinyl bond: 85% or more, 1,4-trans bond: 15% or less, Mn: 2000, viscosity: 80-250 P/45° C., hydroxyl group: 35-55 KOHmg/g

(10) Comparative Component-4 of Component (c):
Maleic anhydride (MAH (manufactured by Kanto Kagaku))

(11) Comparative Component-γ of Component (c):
Carboxylic acid-modified liquid polyisoprene (product name: Kuraprene LIR-410 (manufactured by Kuraray Co., Ltd.)) weight-average molecular weight: 25,000, carboxylic acid content: 10 units/molecule, Tg: −59° C.

(12) Rubber Softener (d):
PW 90 (manufactured by Idemitsu Petrochemical Co., Ltd.), number average molecular weight: 980

(13) Ester-Based Crosslinking Aid (e):
NK ester 3 G (trimethylol propane trimethacrylate; manufactured by Shin-Nakamura Chemical Co., Ltd.), molecular weight: 338

(14) Isobutylene-Based Block Copolymer (f):
SIBSTER 103T (SIBS; manufactured by Kanegafuchi Chemical Ind. Co., Ltd.), styrene content: 31% by weight, number average molecular weight: 96,000, weight average molecular weight: 105,000, molecular weight distribution: 1.09, hardness: 57A, unsaturated bond: 0% (a styrene-isobutylene-styrene block copolymer obtained by living cation polymerization)

(15) Calcium Carbonate (g):
NS400 (manufactured by Sankyo Seifun K.K.)

(16) Hindered Phenol/Phosphite/Lactone-Based Composite Antioxidant (h):
HP2215 (manufactured by Ciba Specialty Chemicals)

(17) Resins Having a Polar Group
(i) Polyester-based thermoplastic elastomer (COPE): Hytrel 4056 (Du Pont-Toray Co., Ltd.)
(ii) Polyamide-based thermoplastic elastomer (COAE): Pevax 5533SN01 (manufactured by Toray industries Inc.)
(iii) Ionomer: Himilan 1554 (manufactured by Du Pont-Mitsui Polychemicals Co., Ltd.)
(iv) Polyamide (PA6): Grilon R47HWNZ (manufactured by EMS Japan)
(v) Polyethylene terephthalate (PET): SA-1346P (manufactured by Unitika Ltd.)
(vi) Polybutylene terephthalate (PBT): 1401X04 (manufactured by Toray industries Inc.)
(vii) Ethylene-vinyl acetate copolymer (EVA): Evaflex EV-40LX (manufactured by Du Pont-Mitsui Polychemicals Co., Ltd.)
(viii) Ethylene-ethyl acrylate copolymer (EEA): NUC-6170 (manufactured by Nippon Unicar Co., Ltd.)
(ix) Saponified ethylene-vinyl acetate copolymer (saponified EVA): Melthene H6051 (manufactured by Tosoh Corporation)
(x) Nitrile-butadiene rubber (NBR): PNC-38 (manufactured by JSR Corporation)
(xi) Polyacetal (POM): Duracon M90S (manufactured by Polyplastics Co., Ltd.)

Examples 1 to 7 and Comparative Examples 1 to 9

Respective components in amounts shown in Table 1 were charged into a twin-screw extruder with L/D of 47 and were melt-kneaded at a kneading temperature of 180° C. and a screw rotation number of 250 rpm, whereby pellets were formed. Then, the resulting pellets were subjected to injection molding to prepare test pieces, which were then subjected to each test. Evaluation results are shown in Table 1.

TABLE 1

| | | | Example | | | | | | | Comparative Example | |
|---|---|---|---|---|---|---|---|---|---|---|---|
| | | | 1 | 2 | 3 | 4 | 5 | 6 | 7 | 1 | 2 |
| Thermo-plastic elastomer composition | Component (a-1) SEPS | part by weight | 100 | 50 | 100 | 0 | 0 | 50 | 0 | 50 | 50 |
| | Component (a-2) SBBS | part by weight | 0 | 50 | 0 | 100 | 0 | 0 | 0 | 50 | 50 |
| | Component (a-3) SEBS | part by weight | 0 | 0 | 0 | 0 | 0 | 0 | 100 | 0 | 0 |
| | Component (a-4) CEBC | part by weight | 0 | 0 | 0 | 0 | 100 | 50 | 0 | 0 | 0 |
| | Component (b) Perhexa 25B | part by weight | 1.35 | 0.6 | 1.35 | 1.35 | 1.35 | 1.35 | 1.35 | 0 | 3.3 |
| | Component (c) OC-800S | part by weight | 50 | 17 | 50 | 50 | 50 | 50 | 17 | 17 | 17 |
| | Comparative component (c-1) E-1000-8 | part by weight | — | — | — | — | — | — | — | — | — |
| | Comparative component (c-2) MM-1000-80 | part by weight | — | — | — | — | — | — | — | — | — |
| | Comparative component (c-3) G-2000 | part by weight | — | — | — | — | — | — | — | — | — |
| | Comparative component (c-4) MAH | part by weight | — | — | — | — | — | — | — | — | — |
| | Comparative component (c-5) LIR-410 | part by weight | — | — | — | — | — | — | — | — | — |
| | Component (d) PW-90 | part by weight | — | 135 | 55 | 55 | 55 | 55 | 55 | 135 | 135 |
| | Component (e) NK ester 3G | part by weight | — | 1.1 | 2.4 | 2.4 | 2.4 | 2.4 | 2.4 | 1.1 | 1.1 |
| | Component (f) SIBS | part by weight | — | 65 | 400 | 400 | 400 | 400 | 400 | 65 | 65 |
| | Component (g) NS-400 | part by weight | — | 35 | 100 | 100 | 100 | 100 | 100 | 35 | 35 |
| | Component (h) HP2215 | part by weight | 0.2 | 0.5 | 1 | 1 | 1 | 1 | 1 | 0.5 | 0.5 |

TABLE 1-continued

| Evaluation result | | | | | | | | | | |
|---|---|---|---|---|---|---|---|---|---|---|
| Specific gravity | — | 0.93 | 0.93 | 0.96 | 0.96 | 0.94 | 0.93 | 0.93 | 0.93 | 0.93 |
| Hardness | Shore A | 55 | 15 | 47 | 47 | 50 | 53 | 53 | 14 | 23 |
| Tensile strength | MPa | 11.7 | 5.7 | 6.8 | 5.9 | 6.3 | 6.7 | 6.4 | 5.8 | 5.4 |
| 100% Modulus | MPa | 1.4 | 0.9 | 1.3 | 1.3 | 1.4 | 1.5 | 1.5 | 0.9 | 1.1 |
| Elongation | % | 450 | 500 | 470 | 500 | 520 | 480 | 510 | 520 | 430 |
| Gas generation during molding | — | A | A | A | A | A | A | A | A | B |
| Stickiness of molded article | — | A | A | A | A | A | A | A | B | B |
| Injection moldability | — | A | A | A | A | A | A | A | A | B |
| Extrusion moldability | — | A | A | A | A | A | A | A | A | B |
| Thermal resistance (compression set) | — | A | A | A | A | A | A | A | B | A |
| Oil resistance (volume change ratio) | — | A | A | A | A | A | A | A | B | A |

| | | | | Comparative Example |||||||
|---|---|---|---|---|---|---|---|---|---|---|
| | | | | 3 | 4 | 5 | 6 | 7 | 8 | 9 |
| Thermoplastic elastomer composition | Component (a-1) SEPS | part by weight | 50 | 50 | 100 | 100 | 100 | 100 | 100 |
| | Component (a-2) SBBS | part by weight | 50 | 50 | 0 | 0 | 0 | 0 | 0 |
| | Component (a-3) SEBS | part by weight | 0 | 0 | 0 | 0 | 0 | 0 | 0 |
| | Component (a-4) CEBC | part by weight | 0 | 0 | 0 | 0 | 0 | 0 | 0 |
| | Component (b) Perhexa 25B | part by weight | 0.6 | 0.6 | 1.35 | 1.35 | 1.35 | 1.35 | 1.35 |
| | Component (c) OC-800S | part by weight | 0 | 100 | — | — | — | — | — |
| | Comparative component (c-1) E-1000-8 | part by weight | — | — | 50 | — | — | — | — |
| | Comparative component (c-2) MM-1000-80 | part by weight | — | — | — | 50 | — | — | — |
| | Comparative component (c-3) G-2000 | part by weight | — | — | — | — | 50 | — | — |
| | Comparative component (c-4) MAH | part by weight | — | — | — | — | — | 2 | — |
| | Comparative component (c-5) LIR-410 | part by weight | — | — | — | — | — | — | 50 |
| | Component (d) PW-90 | part by weight | 135 | 135 | — | — | — | 55 | 55 |
| | Component (e) NK ester 3G | part by weight | 1.1 | 1.1 | — | — | — | 2.4 | 2.4 |
| | Component (f) SIBS | part by weight | 65 | 65 | — | — | — | 400 | 400 |
| | Component (g) NS-400 | part by weight | 35 | 35 | — | — | — | 100 | 100 |
| | Component (h) HP2215 | part by weight | 0.5 | 0.5 | 0.2 | 0.2 | 0.2 | 1 | 1 |
| Evaluation result | Specific gravity | — | 0.93 | 0.93 | 0.93 | 0.93 | 0.93 | 0.93 | 0.93 |
| | Hardness | Shore A | 17 | 11 | 60 | 61 | 61 | 48 | 50 |
| | Tensile strength | MPa | 6 | 4.7 | 6.4 | 6.1 | 6.8 | 3.8 | 4.2 |
| | 100% Modulus | MPa | 0.9 | 0.8 | 1.5 | 1.5 | 1.5 | 1.4 | 1.4 |
| | Elongation | % | 510 | 500 | 310 | 290 | 300 | 360 | 420 |
| | Gas generation during molding | — | A | B | A | A | A | B | B |
| | Stickiness of molded article | — | A | B | A | A | A | A | A |
| | Injection moldability | — | A | B | B | B | B | B | B |
| | Extrusion moldability | — | A | B | B | B | B | B | B |
| | Thermal resistance (compression set) | — | A | B | B | B | B | A | A |
| | Oil resistance (volume change ratio) | — | A | B | A | A | A | B | B |

As is apparent from Table 1, the thermoplastic elastomer compositions of Examples 1 to 7 showed satisfactory properties irrespective of presence of the optional components (d) to (h).

On the other hand, in Comparative Examples 1 and 2, the blending amount of the component (b) falls outside the range of the invention. When the component (b) is less than the lower limit, graft polymerization of the component (c) to the component (a) of the resulting thermoplastic elastomer composition is not sufficiently achieved and stickiness becomes worse, as well as crosslinking is not sufficiently achieved and thermal resistance and oil resistance of the resulting thermoplastic elastomer composition become worse. When the component (b) exceeds the upper limit, mechanical properties decrease, the softener tends to bleed out of the resulting thermoplastic elastomer composition, and peeling, deformation, and flow mark are apt to occur in molded articles. Furthermore, gas generation during the molding becomes remarkable.

In Comparative Examples 3 and 4, the blending amount of the component (c) falls outside the range of the invention. When the component (c) is less than the lower limit, the polar group necessary for exhibiting compatibility with the resin cannot be grafted. When the component (c) exceeds the upper limit, mechanical properties decrease, decrease of mechanical properties and moldability of the resulting thermoplastic elastomer composition is observed, and shape and moldability of the pellets become worse.

In Comparative Examples 5 to 9, instead of the carboxylated liquid polybutadiene of the component (c), the epoxydated liquid polybutadiene (Comparative Example 5), the methacrylated liquid polybutadiene (Comparative Example 6), the hydroxyl group-containing butadiene (Comparative Example 7), the maleic anhydride (Comparative Example 8), or the carboxylic acid-modified liquid polyisoprene (Comparative Example 9) was blended as a comparative component. When the carboxylated liquid polybutadiene is not used as the component (c), the resulting products are poor in moldability, thermal stability, hardness, and elongation.

Examples 8 to 14 and Comparative Example 10

Each of the thermoplastic elastomer compositions obtained in Examples 1 to 4 and the polyester-based thermoplastic elastomer (COPE) were blended in a ratio of 40:60 (% by weight), charged into a twin-screw extruder with L/D of 47, and melt-kneaded at a kneading temperature of 220° C. and a screw rotation number of 350 rpm, whereby pellets were formed. Then, the resulting pellets were subjected to injection molding to prepare test pieces, which were then subjected to each test. Evaluation results are shown in Table 2. Moreover, as Comparative Example 10, evaluation in the case of COPE alone was conducted. The results are shown in Table 2.

Comparative Examples 11 to 19

Each of the thermoplastic elastomer compositions obtained in Comparative Examples 1 to 9 and COPE were blended in a ratio of 40:60 (% by weight) and the physical properties, injection moldability, extrusion moldability, and bleeding resistance of the pellets obtained from the resulting composition in the same manner as in Examples 8 to 14 were evaluated. The results are shown in Table 2. The thermoplastic elastomer compositions of Comparative Examples 1 to 9 falling outside the invention are inferior in compatibility with COPE, and moldability and bleeding resistance have became worse.

TABLE 2

| | | | Example | | | | | | | Comparative Example | |
|---|---|---|---|---|---|---|---|---|---|---|---|
| | | | 8 | 9 | 10 | 11 | 12 | 13 | 14 | 10 | 11 |
| Resin composition | Thermoplastic elastomer composition | Kind | Ex. 1 | Ex. 2 | Ex. 3 | Ex. 4 | Ex. 5 | Ex. 6 | Ex. 7 | — | Com. Ex. 1 |
| | | part by weight | 40 | 40 | 40 | 40 | 40 | 40 | 40 | — | 40 |
| | Polar group-containing resin | Kind | COPE | COPE | COPE | COPE | COPE | COPE | COPE | COPE | COPE |
| | | part by weight | 60 | 60 | 60 | 60 | 60 | 60 | 60 | 100 | 60 |
| Evaluation result | Specific gravity | — | 1.07 | 1.07 | 1.08 | 1.08 | 1.07 | 1.05 | 1.05 | 1.16 | 1.07 |
| | Hardness | Shore A | 82 | 66 | 79 | 79 | 80 | 80 | 80 | 27D | 66 |
| | Tensile strength | MPa | 8.6 | 7.6 | 7.8 | 7.7 | 8.1 | 7.7 | 7.0 | 28 | 7.6 |
| | 100% Modulus | MPa | 6 | 5.8 | 5.9 | 5.9 | 6.1 | 5.8 | 5.8 | 9 | 5.8 |
| | Elongation | % | 720 | 740 | 730 | 740 | 680 | 640 | 610 | 900 | 760 |
| | Injection moldability | visually | A | A | A | A | A | A | A | B | B |
| | Extrusion moldability | visually | A | A | A | A | A | A | A | B | B |
| | Bleeding resistance | visually | A | A | A | A | A | A | A | A | A |

| | | | Comparative Example | | | | | | | |
|---|---|---|---|---|---|---|---|---|---|---|
| | | | 12 | 13 | 14 | 15 | 16 | 17 | 18 | 19 |
| Resin composition | Thermoplastic elastomer composition | Kind | Com. Ex. 2 | Com. Ex. 3 | Com. Ex. 4 | Com. Ex. 5 | Com. Ex. 6 | Com. Ex. 7 | Com. Ex. 8 | Com. Ex. 9 |
| | | part by weight | 40 | 40 | 40 | 40 | 40 | 40 | 40 | 40 |
| | Polar group-containing resin | Kind | COPE | COPE | COPE | COPE | COPE | COPE | COPE | COPE |
| | | part by weight | 60 | 60 | 60 | 60 | 60 | 60 | 60 | 60 |
| Evaluation result | Specific gravity | — | 1.07 | 1.07 | 1.07 | 1.07 | 1.07 | 1.07 | 1.05 | 1.05 |
| | Hardness | Shore A | 69 | 67 | 64 | 84 | 85 | 85 | 76 | 77 |
| | Tensile strength | MPa | 7.6 | 7.7 | 7.5 | 7.1 | 7.5 | 7.3 | 6.5 | 7.2 |
| | 100% Modulus | MPa | 5.8 | 5.8 | 5.7 | 5.4 | 5.3 | 5.2 | 5.3 | 5.7 |
| | Elongation | % | 710 | 740 | 740 | 610 | 620 | 620 | 630 | 600 |
| | Injection moldability | visually | B | B | B | B | B | B | B | B |
| | Extrusion moldability | visually | B | B | B | B | B | B | B | B |
| | Bleeding resistance | visually | A | A | B | A | A | A | A | A |

As is apparent from Table 2, the thermoplastic elastomer compositions of Examples 1 to 7 are excellent in compatibility with COPE, and there can be obtained COPE thermoplastic resin compositions excellent in a balance of flexibility and mechanical properties, moldability, and bleeding resistance as compared with the case of COPE alone shown in Comparative Example 10.

Examples 15 to 21 and Comparative Example 20

Each of the thermoplastic elastomer compositions obtained in Examples 1 to 7 and the polyamide-based thermoplastic elastomer (COAE) were blended in a ratio of 40:60 (% by weight), charged into a twin-screw extruder with L/D of 47, and melt-kneaded at a kneading temperature of 220° C. and a screw rotation number of 350 rpm, whereby pellets were formed. Then, the resulting pellets were subjected to injection molding to prepare test pieces, which were then subjected to each test. Evaluation results are shown in Table 3. Moreover, as Comparative Example 20, evaluation of the case of COAE alone was conducted. The results are shown in Table 3.

composition in the same manner as in Examples 15 to 21 were evaluated. The results are shown in Table 3. The thermoplastic elastomer compositions of Comparative Examples 1 to 9 falling outside the invention are inferior in compatibility with COAE and moldability and bleeding resistance have became worse.

TABLE 3

|  |  |  | Example | | | | | | | Comparative Example | |
|---|---|---|---|---|---|---|---|---|---|---|---|
|  |  |  | 15 | 16 | 17 | 18 | 19 | 20 | 21 | 20 | 21 |
| Resin composition | Thermoplastic elastomer composition | Kind | Ex. 1 | Ex. 2 | Ex. 3 | Ex. 4 | Ex. 5 | Ex. 6 | Ex. 7 | — | Com. Ex. 1 |
|  |  | part by weight | 40 | 40 | 40 | 40 | 40 | 40 | 40 | — | 40 |
|  | Polar group-containing resin | Kind | COAE | COAE | COAE | COAE | COAE | COAE | COAE | COAE | COAE |
|  |  | part by weight | 60 | 60 | 60 | 60 | 60 | 60 | 60 | 100 | 60 |
| Evaluation result | Specific gravity | — | 0.98 | 0.98 | 0.99 | 0.99 | 0.99 | 0.97 | 0.97 | 1.01 | 0.98 |
|  | Hardness | Shore A | 95 | 93 | 95 | 95 | 94 | 94 | 94 | 55D | 93 |
|  | Tensile strength | MPa | 12.4 | 11.5 | 11.6 | 11.5 | 10.2 | 9.7 | 10.0 | 44 | 11.5 |
|  | 100% Modulus | MPa | 4.8 | 4.6 | 4.7 | 4.7 | 4.5 | 4.3 | 4.3 | 7 | 4.6 |
|  | Elongation | % | 450 | 470 | 460 | 740 | 380 | 360 | 320 | 450 | 480 |
|  | Injection moldability | visually | A | A | A | A | A | A | A | B | B |
|  | Extrusion moldability | visually | A | A | A | A | A | A | A | B | B |
|  | Bleeding resistance | visually | A | A | A | A | A | A | A | A | A |

|  |  |  | Comparative Example | | | | | | | |
|---|---|---|---|---|---|---|---|---|---|---|
|  |  |  | 22 | 23 | 24 | 25 | 26 | 27 | 28 | 29 |
| Resin composition | Thermoplastic elastomer composition | Kind | Com. Ex. 2 | Com. Ex. 3 | Com. Ex. 4 | Com. Ex. 5 | Com. Ex. 6 | Com. Ex. 7 | Com. Ex. 8 | Com. Ex. 9 |
|  |  | part by weight | 40 | 40 | 40 | 40 | 40 | 40 | 40 | 40 |
|  | Polar group-containing resin | Kind | COAE | COAE | COAE | COAE | COAE | COAE | COAE | COAE |
|  |  | part by weight | 60 | 60 | 60 | 60 | 60 | 60 | 60 | 60 |
| Evaluation result | Specific gravity | — | 0.98 | 0.98 | 0.98 | 0.98 | 0.98 | 0.98 | 0.97 | 0.97 |
|  | Hardness | Shore A | 96 | 94 | 91 | 96 | 96 | 96 | 86 | 86 |
|  | Tensile strength | MPa | 11.4 | 11.5 | 11.3 | 10.5 | 10.1 | 10.3 | 8.7 | 8.5 |
|  | 100% Modulus | MPa | 4.6 | 4.6 | 4.5 | 4.3 | 4.3 | 4.2 | 3.8 | 3.8 |
|  | Elongation | % | 440 | 470 | 470 | 350 | 340 | 330 | 320 | 350 |
|  | Injection moldability | visually | B | B | B | B | B | B | B | B |
|  | Extrusion moldability | visually | B | B | B | B | B | B | B | B |
|  | Bleeding resistance | visually | A | A | B | A | A | A | A | A |

As is apparent from Table 3, the thermoplastic elastomer compositions of Examples 1 to 7 are excellent in compatibility with COAE, and there can be obtained COAE thermoplastic resin compositions excellent in a balance of flexibility, mechanical properties, moldability, and bleeding resistance as compared with the case of COAE alone shown in Comparative Example 20.

Comparative Examples 21 to 29

Each of the thermoplastic elastomer compositions obtained in Comparative Examples 1 to 9 and COAE were blended in a ratio of 40:60 (% by weight), and the physical properties, injection moldability, extrusion moldability, and bleeding resistance of the pellets obtained from the resulting Examples 22 to 28 and Comparative Example 30

Each of the thermoplastic elastomer compositions obtained in Examples 1 to 7 and the ionomer were blended in a ratio of 40:60 (% by weight), charged into a twin-screw extruder with L/D of 47, and melt-kneaded at a kneading temperature of 190° C. and a screw rotation number of 350 rpm, whereby pellets were formed. Then, the resulting pellets were subjected to injection molding to prepare test pieces, which were then subjected to each test. Evaluation results are shown in Table 4. Moreover, as Comparative Example 30, evaluation of the case of the ionomer alone was conducted. The results are shown in Table 4.

TABLE 4

|  |  |  | Example |  |  |  |  |  |  | Comparative Example | |
|---|---|---|---|---|---|---|---|---|---|---|---|
|  |  |  | 22 | 23 | 24 | 25 | 26 | 27 | 28 | 30 | 31 |
| Resin composition | Thermoplastic elastomer | Kind | Ex. 1 | Ex. 2 | Ex. 3 | Ex. 4 | Ex. 5 | Ex. 6 | Ex. 7 | — | Com. Ex. 1 |
|  |  | Composition part by weight | 40 | 40 | 40 | 40 | 40 | 40 | 40 | — | 40 |
|  | Polar group-containing resin | Kind | Ionomer | Ionomer | Ionomer | Ionomer | Ionomer | Ionomer | Ionomer | Ionomer | Ionomer |
|  |  | part by weight | 60 | 60 | 60 | 60 | 60 | 60 | 60 | 100 | 60 |
| Evaluation result | Specific gravity | — | 0.94 | 0.94 | 0.95 | 0.95 | 0.94 | 0.92 | 0.92 | 0.95 | 0.94 |
|  | Hardness | Shore A | 93 | 87 | 95 | 95 | 93 | 93 | 93 | 55D | 87 |
|  | Tensile strength | MPa | 8.4 | 7.4 | 7.6 | 7.4 | 7.1 | 6.7 | 8.0 | 27 | 7.4 |
|  | 100% Modulus | MPa | 5.4 | 5.2 | 5.3 | 5.3 | 5.2 | 4.9 | 5.0 | 8 | 5.2 |
|  | Elongation | % | 410 | 430 | 420 | 430 | 410 | 390 | 370 | 390 | 440 |
|  | Injection moldability | visually | A | A | A | A | A | A | A | B | B |
|  | Extrusion moldability | visually | A | A | A | A | A | A | A | B | B |
|  | Bleeding resistance | visually | A | A | A | A | A | A | A | A | A |

|  |  |  | Comparative Example | | | | | | | |
|---|---|---|---|---|---|---|---|---|---|---|
|  |  |  | 32 | 33 | 34 | 35 | 36 | 37 | 38 | 39 |
| Resin composition | Thermoplastic elastomer | Kind | Com. Ex. 2 | Com. Ex. 3 | Com. Ex. 4 | Com. Ex. 5 | Com. Ex. 6 | Com. Ex. 7 | Com. Ex. 8 | Com. Ex. 9 |
|  |  | Composition part by weight | 40 | 40 | 40 | 40 | 40 | 40 | 40 | 40 |
|  | Polar group-containing resin | Kind | Ionomer | Ionomer | Ionomer | Ionomer | Ionomer | Ionomer | Ionomer | Ionomer |
|  |  | part by weight | 60 | 60 | 60 | 60 | 60 | 60 | 60 | 60 |
| Evaluation result | Specific gravity | — | 0.94 | 0.94 | 0.94 | 0.94 | 0.94 | 0.94 | 0.92 | 0.92 |
|  | Hardness | Shore A | 90 | 88 | 85 | 95 | 95 | 96 | 88 | 88 |
|  | Tensile strength | MPa | 7.3 | 7.4 | 7.2 | 6.8 | 6.9 | 6.9 | 6.3 | 5.3 |
|  | 100% Modulus | MPa | 5.2 | 5.2 | 5.1 | 4.8 | 4.6 | 4.6 | 4.4 | 4.5 |
|  | Elongation | % | 400 | 430 | 430 | 280 | 280 | 270 | 370 | 330 |
|  | Injection moldability | visually | B | B | B | B | B | B | B | B |
|  | Extrusion moldability | visually | B | B | B | B | B | B | B | B |
|  | Bleeding resistance | visually | A | A | B | A | A | A | A | A |

As is apparent from Table 4, the thermoplastic elastomer compositions of Examples 1 to 7 are excellent in compatibility with the ionomer, and there can be obtained ionomer-based thermoplastic resin compositions excellent in a balance of mechanical properties, moldability, and bleeding resistance as compared with the case of the ionomer alone shown in Comparative Example 30.

Comparative Examples 31 to 39

Each of the thermoplastic elastomer compositions obtained in Comparative Examples 1 to 9 and the ionomer were blended in a ratio of 40:60 (% by weight), and the physical properties, injection moldability, extrusion moldability, and bleeding resistance of the pellets obtained from the resulting composition in the same manner as in Examples 22 to 28 were evaluated. The results are shown in Table 4. The thermoplastic elastomer compositions of Comparative Examples 1 to 9 falling outside the invention are inferior in compatibility with the ionomer, and moldability and bleeding resistance have became worse.

Examples 29 to 35 and Comparative Example 40

Each of the thermoplastic elastomer compositions obtained in Examples 1 to 7 and the nylon 6 (PA6) were blended in a ratio of 40:60 (% by weight), charged into a twin-screw extruder with L/D of 47, and melt-kneaded at a kneading temperature of 240° C. and a screw rotation number of 350 rpm, whereby pellets were formed. Then, the resulting pellets were subjected to injection molding to prepare test pieces, which were then subjected to each test. Evaluation results are shown in Table 5. Moreover, as Comparative Example 40, evaluation of the case of PA6 alone was conducted. The results are shown in Table 5.

TABLE 5

| | | | Example | | | | | | | Comparative Example | |
|---|---|---|---|---|---|---|---|---|---|---|---|
| | | | 29 | 30 | 31 | 32 | 33 | 34 | 35 | 40 | 41 |
| Resin composition | Thermoplastic elastomer composition | Kind | Ex. 1 | Ex. 2 | Ex. 3 | Ex. 4 | Ex. 5 | Ex. 6 | Ex. 7 | — | Com. Ex. 1 |
| | | part by weight | 40 | 40 | 40 | 40 | 40 | 40 | 40 | — | 40 |
| | Polar group-containing resin | Kind | PA6 | PA6 | PA6 | PA6 | PA6 | PA6 | PA6 | PA6 | PA6 |
| | | part by weight | 60 | 60 | 60 | 60 | 60 | 60 | 60 | 100 | 60 |
| Evaluation result | Specific gravity | — | 1.01 | 1.01 | 1.03 | 1.03 | 1.02 | 1 | 1 | 1.07 | 1.01 |
| | Hardness | Shore A | 93 | 95 | 97 | 97 | 97 | 97 | 97 | 75D | 92 |
| | Tensile strength | MPa | 15.1 | 14.1 | 14.3 | 14.1 | 12.3 | 11.7 | 12.0 | 55 | 14.1 |
| | 100% Modulus | MPa | 0.6 | 0.4 | 0.5 | 0.5 | 0.5 | 0.5 | 0.6 | 0 | 0.4 |
| | Elongation | % | 220 | 240 | 220 | 230 | 220 | 210 | 180 | 60 | 240 |
| | Injection moldability | visually | A | A | A | A | A | A | A | B | B |
| | Extrusion moldability | visually | A | A | A | A | A | A | A | B | B |
| | Bleeding resistance | visually | A | A | A | A | A | A | A | A | A |

| | | | Comparative Example | | | | | | | |
|---|---|---|---|---|---|---|---|---|---|---|
| | | | 42 | 43 | 44 | 45 | 46 | 47 | 48 | 49 |
| Resin composition | Thermoplastic elastomer composition | Kind | Com. Ex. 2 | Com. Ex. 3 | Com. Ex. 4 | Com. Ex. 5 | Com. Ex. 6 | Com. Ex. 7 | Com. Ex. 8 | Com. Ex. 9 |
| | | part by weight | 40 | 40 | 40 | 40 | 40 | 40 | 40 | 40 |
| | Polar group-containing resin | Kind | PA6 | PA6 | PA6 | PA6 | PA6 | PA6 | PA6 | PA6 |
| | | part by weight | 60 | 60 | 60 | 60 | 60 | 60 | 60 | 60 |
| Evaluation result | Specific gravity | — | 1.01 | 1.01 | 1.01 | 1.01 | 1.01 | 1.01 | 1 | 1 |
| | Hardness | Shore A | 95 | 94 | 97 | 96 | 96 | 96 | 95 | 89 |
| | Tensile strength | MPa | 14.1 | 14.2 | 14 | 12.3 | 12.5 | 13 | 10 | 11.5 |
| | 100% Modulus | MPa | 0.4 | 0.4 | 0.3 | 0.6 | 0.6 | 0.6 | 0 | 0 |
| | Elongation | % | 200 | 240 | 230 | 110 | 80 | 90 | 110 | 150 |
| | Injection moldability | visually | B | B | B | B | B | B | B | B |
| | Extrusion moldability | visually | B | B | B | B | B | B | B | B |
| | Bleeding resistance | visually | A | A | B | A | A | A | A | A |

As is apparent from Table 5, the thermoplastic elastomer compositions of Examples 1 to 7 are excellent in compatibility with PA6, and there can be obtained PA6-based thermoplastic resin compositions excellent in a balance of flexibility and mechanical properties, moldability, and bleeding resistance as compared with the case of PA6 alone shown in Comparative Example 40.

Comparative Examples 41 to 49

Each of the thermoplastic elastomer compositions obtained in Comparative Examples 1 to 9 and PA6 were blended in a ratio of 40:60 (% by weight), and the physical properties, injection moldability, extrusion moldability, and bleeding resistance of the pellets obtained from the resulting composition in the same manner as in Examples 29 to 35 were evaluated. The results are shown in Table 5. The thermoplastic elastomer compositions of Comparative Examples 1 to 9 falling outside the invention are inferior in compatibility with PA6, and moldability and bleeding resistance have became worse.

Examples 36 to 42 and Comparative Example 50

Each of the thermoplastic elastomer compositions obtained in Examples 1 to 7 and the polyethylene terephthalate (PET) were blended in a ratio of 40:60 (% by weight), charged into a twin-screw extruder with L/D of 47, and melt-kneaded at a kneading temperature of 240° C. and a screw rotation number of 350 rpm, whereby pellets were formed. Then, the resulting pellets were subjected to injection molding to prepare test pieces, which were then subjected to each test. Evaluation results are shown in Table 6. Moreover, as Comparative Example 50, evaluation of the case of PET alone was conducted. The results are shown in Table 6.

TABLE 6

|  |  |  | Example | | | | | | | Comparative Example | |
|---|---|---|---|---|---|---|---|---|---|---|---|
|  |  |  | 36 | 37 | 38 | 39 | 40 | 41 | 42 | 50 | 51 |
| Resin composition | Thermoplastic elastomer composition | Kind | Ex. 1 | Ex. 2 | Ex. 3 | Ex. 4 | Ex. 5 | Ex. 6 | Ex. 7 | — | Com. Ex. 1 |
|  |  | part by weight | 40 | 40 | 40 | 40 | 40 | 40 | 40 | — | 40 |
|  | Polar group-containing resin | Kind | PET | PET | PET | PET | PET | PET | PET | PET | PET |
|  |  | part by weight | 60 | 60 | 60 | 60 | 60 | 60 | 60 | 100 | 60 |
| Evaluation result | Specific gravity | — | 1.18 | 1.18 | 1.19 | 1.19 | 1.18 | 1.16 | 1.16 | 1.34 | 1.18 |
|  | Hardness | Shore A | 95 | 88 | 95 | 95 | 95 | 95 | 95 | 57D | 88 |
|  | Tensile strength | MPa | 15.3 | 14.4 | 14.5 | 14.4 | 10.3 | 9.8 | 10.0 | 56 | 14.4 |
|  | 100% Modulus | MPa | 6 | 5.8 | 5.9 | 5.9 | 5.6 | 5.3 | 5.4 | 9 | 5.8 |
|  | Elongation | % | 330 | 350 | 340 | 350 | 280 | 270 | 230 | 250 | 360 |
|  | Injection moldability | visually | A | A | A | A | A | A | A | B | B |
|  | Extrusion moldability | visually | A | A | A | A | A | A | A | B | B |
|  | Bleeding resistance | visually | A | A | A | A | A | A | A | A | A |

|  |  |  | Comparative Example | | | | | | | |
|---|---|---|---|---|---|---|---|---|---|---|
|  |  |  | 52 | 53 | 54 | 55 | 56 | 57 | 58 | 59 |
| Resin composition | Thermoplastic elastomer composition | Kind | Com. Ex. 2 | Com. Ex. 3 | Com. Ex. 4 | Com. Ex. 5 | Com. Ex. 6 | Com. Ex. 7 | Com. Ex. 8 | Com. Ex. 9 |
|  |  | part by weight | 40 | 40 | 40 | 40 | 40 | 40 | 40 | 40 |
|  | Polar group-containing resin | Kind | PET | PET | PET | PET | PET | PET | PET | PET |
|  |  | part by weight | 60 | 60 | 60 | 60 | 60 | 60 | 60 | 60 |
| Evaluation result | Specific gravity | — | 1.18 | 1.18 | 1.18 | 1.18 | 1.18 | 1.18 | 1.16 | 1.16 |
|  | Hardness | Shore A | 91 | 89 | 87 | 96 | 96 | 96 | 91 | 93 |
|  | Tensile strength | MPa | 14.3 | 14.4 | 14.2 | 12.6 | 13.2 | 13.2 | 9.7 | 8.2 |
|  | 100% Modulus | MPa | 5.8 | 5.8 | 5.7 | 5.4 | 5.3 | 5.1 | 5.1 | 4.8 |
|  | Elongation | % | 320 | 350 | 350 | 220 | 210 | 220 | 250 | 240 |
|  | Injection moldability | visually | B | B | B | B | B | B | B | B |
|  | Extrusion moldability | visually | B | B | B | B | B | B | B | B |
|  | Bleeding resistance | visually | A | A | B | A | A | A | A | A |

As is apparent from Table 6, the thermoplastic elastomer compositions of Examples 1 to 7 are excellent in compatibility with PET, and there can be obtained PET-based thermoplastic resin compositions excellent in a balance of flexibility and mechanical properties, moldability, and bleeding resistance as compared with the case of PET alone shown in Comparative Example 50.

Comparative Examples 51 to 59

Each of the thermoplastic elastomer compositions obtained in Comparative Examples 1 to 9 and PET were blended in a ratio of 40:60 (% by weight), and the physical properties, injection moldability, extrusion moldability, and bleeding resistance of the pellets obtained from the resulting composition in the same manner as in Examples 36 to 42 were evaluated. The results are shown in Table 6. The thermoplastic elastomer compositions of Comparative Examples 1 to 9 falling outside the invention are inferior in compatibility with PET, and moldability and bleeding resistance have became worse.

Examples 43 to 49 and Comparative Example 60

Each of the thermoplastic elastomer compositions obtained in Examples 1 to 7 and the polybutylene terephthalate (PBT) were blended in a ratio of 40:60 (% by weight), charged into a twin-screw extruder with L/D of 47, and melt-kneaded at a kneading temperature of 240° C. and a screw rotation number of 350 rpm, whereby pellets were formed. Then, the resulting pellets were subjected to injection molding to prepare test pieces, which were then subjected to each test. Evaluation results are shown in Table 7. Moreover, as Comparative Example 60, evaluation of the case of PBT alone was conducted. The results are shown in Table 7.

TABLE 7

|  |  |  | Example | | | | | | | Comparative Example | |
|---|---|---|---|---|---|---|---|---|---|---|---|
|  |  |  | 43 | 44 | 45 | 46 | 47 | 48 | 49 | 60 | 61 |
| Resin composition | Thermoplastic elastomer composition | Kind | Ex. 1 | Ex. 2 | Ex. 3 | Ex. 4 | Ex. 5 | Ex. 6 | Ex. 7 | — | Com. Ex. 1 |
|  |  | part by weight | 40 | 40 | 40 | 40 | 40 | 40 | 40 | — | 40 |
|  | Polar group-containing resin | Kind | PBT | PBT | PBT | PBT | PBT | PBT | PBT | PBT | PBT |
|  |  | part by weight | 60 | 60 | 60 | 60 | 60 | 60 | 60 | 100 | 60 |
| Evaluation result | Specific gravity | — | 1.16 | 1.16 | 1.17 | 1.17 | 1.16 | 1.14 | 1.14 | 1.31 | 1.16 |
|  | Hardness | Shore A | 97 | 97 | 97 | 97 | 97 | 97 | 97 | 75D | 93 |
|  | Tensile strength | MPa | 15.1 | 14.1 | 14.3 | 14.1 | 13.2 | 12.5 | 12.0 | 55 | 14.1 |
|  | 100% Modulus | MPa | 6.6 | 6.4 | 6.5 | 6.5 | 6.3 | 6.0 | 6.0 | 10 | 6.4 |
|  | Elongation | % | 270 | 290 | 280 | 290 | 250 | 240 | 190 | 150 | 300 |
|  | Injection moldability | visually | A | A | A | A | A | A | A | B | B |
|  | Extrusion moldability | visually | A | A | A | A | A | A | A | B | B |
|  | Bleeding resistance | visually | A | A | A | A | A | A | A | A | A |

|  |  |  | Comparative Example | | | | | | | |
|---|---|---|---|---|---|---|---|---|---|---|
|  |  |  | 62 | 63 | 64 | 65 | 66 | 67 | 68 | 69 |
| Resin composition | Thermoplastic elastomer composition | Kind | Com. Ex. 2 | Com. Ex. 3 | Com. Ex. 4 | Com. Ex. 5 | Com. Ex. 6 | Com. Ex. 7 | Com. Ex. 8 | Com. Ex. 9 |
|  |  | part by weight | 40 | 40 | 40 | 40 | 40 | 40 | 40 | 40 |
|  | Polar group-containing resin | Kind | PBT | PBT | PBT | PBT | PBT | PBT | PBT | PBT |
|  |  | part by weight | 60 | 60 | 60 | 60 | 60 | 60 | 60 | 60 |
| Evaluation result | Specific gravity | — | 1.16 | 1.16 | 1.16 | 1.16 | 1.16 | 1.16 | 1.14 | 1.14 |
|  | Hardness | Shore A | 95 | 92 | 97 | 97 | 97 | 97 | 91 | 92 |
|  | Tensile strength | MPa | 14.1 | 14.2 | 14 | 13 | 13.6 | 13 | 11.5 | 10.8 |
|  | 100% Modulus | MPa | 6.4 | 6.4 | 6.3 | 5.5 | 5.7 | 5.6 | 5.6 | 5.5 |
|  | Elongation | % | 260 | 290 | 290 | 130 | 130 | 150 | 140 | 160 |
|  | Injection moldability | visually | B | B | B | B | B | B | B | B |
|  | Extrusion moldability | visually | B | B | B | B | B | B | B | B |
|  | Bleeding resistance | visually | A | A | B | A | A | A | A | A |

As is apparent from Table 7, the thermoplastic elastomer compositions of Examples 1 to 7 are excellent in compatibility with PBT, and there can be obtained PBT-based thermoplastic resin compositions excellent in a balance of flexibility and mechanical properties, moldability, and bleeding resistance as compared with the case of PBT alone shown in Comparative Example 60.

Comparative Examples 61 to 69

Each of the thermoplastic elastomer compositions obtained in Comparative Examples 1 to 9 and PBT were blended in a ratio of 40:60 (% by weight), and the physical properties, injection moldability, extrusion moldability, and bleeding resistance of the pellets obtained from the resulting composition in the same manner as in Examples 43 to 49 were evaluated. The results are shown in Table 7. The thermoplastic elastomer compositions of Comparative Examples 1 to 9 falling outside the invention are inferior in compatibility with PBT, and moldability and bleeding resistance have became worse.

Examples 50 to 56 and Comparative Example 70

Each of the thermoplastic elastomer compositions obtained in Examples 1 to 7 and the ethylene-vinyl acetate copolymer (EVA) were blended in a ratio of 40:60 (% by weight), charged into a twin-screw extruder with L/D of 47, and melt-kneaded at a kneading temperature of 190° C. and a screw rotation number of 350 rpm, whereby pellets were formed. Then, the resulting pellets were subjected to injection molding to prepare test pieces, which were then subjected to each test. Evaluation results are shown in Table 8. Moreover, as Comparative Example 70, evaluation of the case of EVA alone was conducted. The results are shown in Table 8.

TABLE 8

| | | | Example | | | | | | | Comparative Example | |
|---|---|---|---|---|---|---|---|---|---|---|---|
| | | | 50 | 51 | 52 | 53 | 54 | 55 | 56 | 70 | 71 |
| Resin composition | Thermoplastic elastomer composition | Kind | Ex. 1 | Ex. 2 | Ex. 3 | Ex. 4 | Ex. 5 | Ex. 6 | Ex. 7 | — | Com. Ex. 1 |
| | | part by weight | 40 | 40 | 40 | 40 | 40 | 40 | 40 | — | 40 |
| | Polar group-containing resin | Kind | EVA | EVA | EVA | EVA | EVA | EVA | EVA | EVA | EVA |
| | | part by weight | 60 | 60 | 60 | 60 | 60 | 60 | 60 | 100 | 60 |
| Evaluation result | Specific gravity | — | 0.95 | 0.95 | 0.97 | 0.97 | 0.96 | 0.94 | 0.94 | 0.97 | 0.95 |
| | Hardness | Shore A | 49 | 33 | 46 | 46 | 47 | 47 | 47 | 45 | 33 |
| | Tensile strength | MPa | 3.6 | 2.6 | 2.8 | 2.6 | 2.8 | 2.7 | 2.1 | 7 | 2.6 |
| | 100% Modulus | MPa | 2.1 | 1.9 | 2 | 2 | 2.1 | 2.0 | 2.1 | 2.5 | 1.9 |
| | Elongation | % | 780 | 800 | 790 | 800 | 880 | 840 | 830 | 1000 | 810 |
| | Injection moldability | visually | A | A | A | A | A | A | A | B | B |
| | Extrusion moldability | visually | A | A | A | A | A | A | A | B | B |
| | Bleeding resistance | visually | A | A | A | A | A | A | A | A | A |

| | | | Comparative Example | | | | | | | |
|---|---|---|---|---|---|---|---|---|---|---|
| | | | 72 | 73 | 74 | 75 | 76 | 77 | 78 | 79 |
| Resin composition | Thermoplastic elastomer composition | Kind | Com. Ex. 2 | Com. Ex. 3 | Com. Ex. 4 | Com. Ex. 5 | Com. Ex. 6 | Com. Ex. 7 | Com. Ex. 8 | Com. Ex. 9 |
| | | part by weight | 40 | 40 | 40 | 40 | 40 | 40 | 40 | 40 |
| | Polar group-containing resin | Kind | EVA | EVA | EVA | EVA | EVA | EVA | EVA | EVA |
| | | part by weight | 60 | 60 | 60 | 60 | 60 | 60 | 60 | 60 |
| Evaluation result | Specific gravity | — | 0.95 | 0.95 | 0.95 | 0.95 | 0.95 | 0.95 | 0.94 | 0.94 |
| | Hardness | Shore A | 36 | 34 | 31 | 53 | 53 | 53 | 44 | 41 |
| | Tensile strength | MPa | 2.5 | 2.6 | 2.4 | 3.2 | 3 | 2.9 | 0.8 | 1.9 |
| | 100% Modulus | MPa | 1.9 | 1.9 | 1.8 | 1.8 | 1.8 | 1.9 | 1.7 | 1.7 |
| | Elongation | % | 770 | 800 | 800 | 660 | 640 | 640 | 830 | 820 |
| | Injection moldability | visually | B | B | B | B | B | B | B | B |
| | Extrusion moldability | visually | B | B | B | B | B | B | B | B |
| | Bleeding resistance | visually | A | A | B | A | A | A | A | A |

As is apparent from Table 8, the thermoplastic elastomer compositions of Examples 1 to 7 are excellent in compatibility with EVA, and there can be obtained EVA-based thermoplastic resin compositions excellent in a balance of flexibility and mechanical properties, moldability, and bleeding resistance as compared with the case of EVA alone shown in Comparative Example 70.

Comparative Examples 71 to 79

Each of the thermoplastic elastomer compositions obtained in Comparative Examples 1 to 9 and EVA were blended in a ratio of 40:60 (% by weight), and the physical properties, injection moldability, extrusion moldability, and bleeding resistance of the pellets obtained from the resulting composition in the same manner as in Examples 50 to 56 were evaluated. The results are shown in Table 8. The thermoplastic elastomer compositions of Comparative Examples 1 to 9 falling outside the invention are inferior in compatibility with EVA, and moldability and bleeding resistance have became worse.

Examples 57 to 63 and Comparative Example 80

Each of the thermoplastic elastomer compositions obtained in Examples 1 to 7 and the ethylene-ethyl acrylate copolymer (EEA) were blended in a ratio of 40:60 (% by weight), charged into a twin-screw extruder with L/D of 47, and melt-kneaded at a kneading temperature of 190° C. and a screw rotation number of 350 rpm, whereby pellets were formed. Then, the resulting pellets were subjected to injection molding to prepare test pieces, which were then subjected to each test. Evaluation results are shown in Table 9. Moreover, as Comparative Example 80, evaluation of the case of EEA alone was conducted. The results are shown in Table 9.

TABLE 9

|  |  |  | Example |  |  |  |  |  |  | Comparative Example | |
|---|---|---|---|---|---|---|---|---|---|---|---|
|  |  |  | 57 | 58 | 59 | 60 | 61 | 62 | 63 | 80 | 81 |
| Resin composition | Thermoplastic elastomer composition | Kind | Ex. 1 | Ex. 2 | Ex. 3 | Ex. 4 | Ex. 5 | Ex. 6 | Ex. 7 | — | Com. Ex. 1 |
|  |  | part by weight | 40 | 40 | 40 | 40 | 40 | 40 | 40 | — | 40 |
|  | Polar group-containing resin | Kind | EEA | EEA | EEA | EEA | EEA | EEA | EEA | EEA | EEA |
|  |  | part by weight | 60 | 60 | 60 | 60 | 60 | 60 | 60 | 100 | 60 |
| Evaluation result | Specific gravity | — | 0.93 | 0.93 | 0.94 | 0.94 | 0.94 | 0.92 | 0.92 | 0.93 | 0.93 |
|  | Hardness | Shore A | 89 | 73 | 85 | 85 | 86 | 86 | 86 | 31D | 72 |
|  | Tensile strength | MPa | 4.7 | 3.7 | 3.9 | 3.8 | 4.2 | 4.0 | 5.0 | 11.8 | 3.8 |
|  | 100% Modulus | MPa | 3.8 | 3.6 | 3.8 | 3.8 | 3.7 | 3.5 | 3.5 | 5.4 | 3.6 |
|  | Elongation | % | 660 | 680 | 670 | 680 | 560 | 530 | 500 | 800 | 690 |
|  | Injection moldability | visually | A | A | A | A | A | A | A | B | B |
|  | Extrusion moldability | visually | A | A | A | A | A | A | A | B | B |
|  | Bleeding resistance | visually | A | A | A | A | A | A | A | A | A |

|  |  |  | Comparative Example | | | | | | | |
|---|---|---|---|---|---|---|---|---|---|---|
|  |  |  | 82 | 83 | 84 | 85 | 86 | 87 | 88 | 89 |
| Resin composition | Thermoplastic elastomer composition | Kind | Com. Ex. 2 | Com. Ex. 3 | Com. Ex. 4 | Com. Ex. 5 | Com. Ex. 6 | Com. Ex. 7 | Com. Ex. 8 | Com. Ex. 9 |
|  |  | part by weight | 40 | 40 | 40 | 40 | 40 | 40 | 40 | 40 |
|  | Polar group-containing resin | Kind | EEA | EEA | EEA | EEA | EEA | EEA | EEA | EEA |
|  |  | part by weight | 60 | 60 | 60 | 60 | 60 | 60 | 60 | 60 |
| Evaluation result | Specific gravity | — | 0.93 | 0.93 | 0.93 | 0.93 | 0.93 | 0.93 | 0.92 | 0.92 |
|  | Hardness | Shore A | 76 | 73 | 71 | 93 | 92 | 91 | 82 | 81 |
|  | Tensile strength | MPa | 3.7 | 3.8 | 3.6 | 4 | 4.1 | 4.1 | 3.2 | 3.1 |
|  | 100% Modulus | MPa | 3.7 | 3.6 | 3.6 | 3.4 | 3.2 | 3.4 | 3 | 3.4 |
|  | Elongation | % | 650 | 680 | 680 | 540 | 520 | 520 | 460 | 450 |
|  | Injection moldability | visually | B | B | B | B | B | B | B | B |
|  | Extrusion moldability | visually | B | B | B | B | B | B | B | B |
|  | Bleeding resistance | visually | A | A | B | A | A | A | A | A |

As is apparent from Table 9, the thermoplastic elastomer compositions of Examples 1 to 7 are excellent in compatibility with EEA, and there can be obtained EEA-based thermoplastic resin compositions excellent in a balance of flexibility and mechanical properties, moldability, and bleeding resistance as compared with the case of EEA alone shown in Comparative Example 80.

Comparative Examples 81 to 89

Each of the thermoplastic elastomer compositions obtained in Comparative Examples 1 to 9 and EEA were blended in a ratio of 40:60 (% by weight), and the physical properties, injection moldability, extrusion moldability, and bleeding resistance of the pellets obtained from the resulting composition in the same manner as in Examples 57 to 63 were evaluated. The results are shown in Table 9. The thermoplastic elastomer compositions of Comparative Examples 1 to 9 falling outside the invention are inferior in compatibility with EEA, and moldability and bleeding resistance have became worse.

Examples 64 to 70 and Comparative Example 90

Each of the thermoplastic elastomer compositions obtained in Examples 1 to 7 and the saponified ethylene-vinyl acetate copolymer (saponified EVA) were blended in a ratio of 40:60 (% by weight), charged into a twin-screw extruder with L/D of 47, and melt-kneaded at a kneading temperature of 200° C. and a screw rotation number of 350 rpm, whereby pellets were formed. Then, the resulting pellets were subjected to injection molding to prepare test pieces, which were then subjected to each test. Evaluation results are shown in Table 10. Moreover, as Comparative Example 90, evaluation of the case of saponified EVA alone was conducted. The results are shown in Table 10.

TABLE 10

|  |  |  | Example |  |  |  |  |  |  | Comparative Example |  |
|---|---|---|---|---|---|---|---|---|---|---|---|
|  |  |  | 64 | 65 | 66 | 67 | 68 | 69 | 70 | 90 | 91 |
| Resin composition | Thermoplastic elastomer composition | Kind | Ex. 1 | Ex. 2 | Ex. 3 | Ex. 4 | Ex. 5 | Ex. 6 | Ex. 7 | — | Com. Ex. 1 |
|  |  | part by weight | 40 | 40 | 40 | 40 | 40 | 40 | 40 | — | 40 |
|  | Polar group-containing resin | Kind | Saponified EVA | Saponified EVA | Saponified EVA | Saponified EVA | Saponified EVA | Saponified EVA | Saponified EVA | Saponified EVA | Saponified EVA |
|  |  | part by weight | 60 | 60 | 60 | 60 | 60 | 60 | 60 | 100 | 60 |
| Evaluation result | Specific gravity | — | 0.94 | 0.94 | 0.95 | 0.95 | 0.94 | 0.92 | 0.92 | 0.95 | 0.94 |
|  | Hardness | Shore A | 77 | 61 | 73 | 73 | 71 | 71 | 71 | 91 | 60 |
|  | Tensile strength | MPa | 4.8 | 3.8 | 4 | 3.8 | 3.6 | 3.4 | 4.0 | 12 | 3.8 |
|  | 100% Modulus | MPa | 3 | 2.8 | 2.9 | 2.9 | 2.8 | 2.7 | 2.7 | 4 | 2.8 |
|  | Elongation | % | 620 | 640 | 620 | 630 | 430 | 410 | 390 | 730 | 640 |
|  | Injection moldability | visually | A | A | A | A | A | A | A | B | B |
|  | Extrusion moldability | visually | A | A | A | A | A | A | A | B | B |
|  | Bleeding resistance | visually | A | A | A | A | A | A | A | A | A |

|  |  |  | Comparative Example |  |  |  |  |  |  |  |
|---|---|---|---|---|---|---|---|---|---|---|
|  |  |  | 92 | 93 | 94 | 95 | 96 | 97 | 98 | 99 |
| Resin composition | Thermoplastic elastomer composition | Kind | Com. Ex. 2 | Com. Ex. 3 | Com. Ex. 4 | Com. Ex. 5 | Com. Ex. 6 | Com. Ex. 7 | Com. Ex. 8 | Com. Ex. 9 |
|  |  | part by weight | 40 | 40 | 40 | 40 | 40 | 40 | 40 | 40 |
|  | Polar group-containing resin | Kind | Saponified EVA | Saponified EVA | Saponified EVA | Saponified EVA | Saponified EVA | Saponified EVA | Saponified EVA | Saponified EVA |
|  |  | part by weight | 60 | 60 | 60 | 60 | 60 | 60 | 60 | 60 |
| Evaluation result | Specific gravity | — | 0.94 | 0.94 | 0.94 | 0.94 | 0.94 | 0.94 | 0.92 | 0.92 |
|  | Hardness | Shore A | 64 | 61 | 59 | 80 | 81 | 81 | 66 | 69 |
|  | Tensile strength | MPa | 3.7 | 3.8 | 3.6 | 4.3 | 4 | 4.1 | 1.8 | 2.9 |
|  | 100% Modulus | MPa | 2.8 | 2.8 | 2.7 | 2.6 | 2.5 | 2.6 | 2.1 | 2.5 |
|  | Elongation | % | 610 | 640 | 640 | 500 | 480 | 520 | 390 | 360 |
|  | Injection moldability | visually | B | B | B | B | B | B | B | B |
|  | Extrusion moldability | visually | B | B | B | B | B | B | B | B |
|  | Bleeding resistance | visually | A | A | B | A | A | A | A | A |

As is apparent from Table 10, the thermoplastic elastomer compositions of Examples 1 to 7 are excellent in compatibility with the saponified EVA, and there can be obtained saponified EVA-based thermoplastic resin compositions excellent in a balance of flexibility and mechanical properties, moldability, and bleeding resistance as compared with the case of the saponified EVA alone shown in Comparative Example 90.

Comparative Examples 91 to 99

Each of the thermoplastic elastomer compositions obtained in Comparative Examples 1 to 9 and the saponified EVA were blended in a ratio of 40:60 (% by weight), and the physical properties, injection moldability, extrusion moldability, and bleeding resistance of the pellets obtained from the resulting composition in the same manner as in Examples 64 to 70 were evaluated. The results are shown in Table 10. The thermoplastic elastomer compositions of Comparative Examples 1 to 9 falling outside the invention are inferior in compatibility with the saponified EVA, and moldability and bleeding resistance have became worse.

Examples 71 to 77 and Comparative Example 100

Each of the thermoplastic elastomer compositions obtained in Examples 1 to 7 and the nitrile rubber (NBR) were blended in a ratio of 40:60 (% by weight), charged into a twin-screw extruder with L/D of 47, and melt-kneaded at a kneading temperature of 190° C. and a screw rotation number of 350 rpm, whereby pellets were formed. Then, the resulting pellets were subjected to injection molding to prepare test pieces, which were then subjected to each test. Evaluation results are shown in Table 11. Moreover, as Comparative Example 100, evaluation of the case of NBR alone was conducted. The results are shown in Table 11.

TABLE 11

|  |  |  | Example | | | | | | | Comparative Example | |
|---|---|---|---|---|---|---|---|---|---|---|---|
|  |  |  | 71 | 72 | 73 | 74 | 75 | 76 | 77 | 100 | 101 |
| Resin composition | Thermoplastic elastomer composition | Kind | Ex. 1 | Ex. 2 | Ex. 3 | Ex. 4 | Ex. 5 | Ex. 6 | Ex. 7 | — | Com. Ex. 1 |
|  |  | part by weight | 40 | 40 | 40 | 40 | 40 | 40 | 40 | — | 40 |
|  | Polar group-containing resin | Kind | NBR | NBR | NBR | NBR | NBR | NBR | NBR | NBR | NBR |
|  |  | part by weight | 60 | 60 | 60 | 60 | 60 | 60 | 60 | 100 | 60 |
| Evaluation result | Specific gravity | — | 0.97 | 0.97 | 0.98 | 0.98 | 0.97 | 0.95 | 0.95 | 1 | 0.97 |
|  | Hardness | Shore A | 66 | 50 | 63 | 63 | 58 | 58 | 58 | 73 | 49 |
|  | Tensile strength | MPa | 5.4 | 4.5 | 4.6 | 4.5 | 4.1 | 3.9 | 4.0 | 14.8 | 4.5 |
|  | 100% Modulus | MPa | 3.6 | 3.4 | 3.5 | 3.5 | 3.2 | 3.0 | 3.2 | 5 | 3.4 |
|  | Elongation | % | 480 | 500 | 490 | 500 | 320 | 300 | 290 | 500 | 510 |
|  | Injection moldability | visually | A | A | A | A | A | A | A | B | B |
|  | Extrusion moldability | visually | A | A | A | A | A | A | A | B | B |
|  | Bleeding resistance | visually | A | A | A | A | A | A | A | A | A |

|  |  |  | Comparative Example | | | | | | | |
|---|---|---|---|---|---|---|---|---|---|---|
|  |  |  | 102 | 103 | 104 | 105 | 106 | 107 | 108 | 109 |
| Resin composition | Thermoplastic elastomer composition | Kind | Com. Ex. 2 | Com. Ex. 3 | Com. Ex. 4 | Com. Ex. 5 | Com. Ex. 6 | Com. Ex. 7 | Com. Ex. 8 | Com. Ex. 9 |
|  |  | part by weight | 40 | 40 | 40 | 40 | 40 | 40 | 40 | 40 |
|  | Polar group-containing resin | Kind | NBR | NBR | NBR | NBR | NBR | NBR | NBR | NBR |
|  |  | part by weight | 60 | 60 | 60 | 60 | 60 | 60 | 60 | 60 |
| Evaluation result | Specific gravity | — | 0.97 | 0.97 | 0.97 | 0.97 | 0.97 | 0.97 | 0.95 | 0.95 |
|  | Hardness | Shore A | 53 | 51 | 48 | 70 | 68 | 69 | 53 | 56 |
|  | Tensile strength | MPa | 4.4 | 4.5 | 4.3 | 4.5 | 4.9 | 4.4 | 2.3 | 2.1 |
|  | 100% Modulus | MPa | 3.4 | 3.4 | 3.3 | 3.1 | 3.2 | 3 | 2.8 | 2.6 |
|  | Elongation | % | 470 | 500 | 500 | 350 | 380 | 340 | 280 | 220 |
|  | Injection moldability | visually | B | B | B | B | B | B | B | B |
|  | Extrusion moldability | visually | B | B | B | B | B | B | B | B |
|  | Bleeding resistance | visually | A | A | B | A | A | A | A | A |

As is apparent from Table 11, the thermoplastic elastomer compositions of Examples 1 to 7 are excellent in compatibility with NBR, and there can be obtained NBR-based thermoplastic resin compositions excellent in a balance of flexibility and mechanical properties, moldability, and bleeding resistance as compared with the case of NBR alone shown in Comparative Example 100.

Comparative Examples 101 to 109

Each of the thermoplastic elastomer compositions obtained in Comparative Examples 1 to 9 and NBR were blended in a ratio of 40:60 (% by weight), and the physical properties, injection moldability, extrusion moldability, and bleeding resistance of the pellets obtained from the resulting composition in the same manner as in Examples 71 to 77 were evaluated. The results are shown in Table 11. The thermoplastic elastomer compositions of Comparative Examples 1 to 9 falling outside the invention are inferior in compatibility with NBR, and moldability and bleeding resistance have became worse.

Examples 78 to 84 and Comparative Example 110

Each of the thermoplastic elastomer compositions obtained in Examples 1 to 7 and the polyacetal (POM) were blended in a ratio of 40:60 (% by weight), charged into a twin-screw extruder with L/D of 47, and melt-kneaded at a kneading temperature of 240° C. and a screw rotation number of 350 rpm, whereby pellets were formed. Then, the resulting pellets were subjected to injection molding to prepare test pieces, which were then subjected to each test. Evaluation results are shown in Table 12. Moreover, as Comparative Example 110, evaluation of the case of POM alone was conducted. The results are shown in Table 12.

TABLE 12

|  |  |  | Example |  |  |  |  |  |  | Comparative Example |  |
|---|---|---|---|---|---|---|---|---|---|---|---|
|  |  |  | 78 | 79 | 80 | 81 | 82 | 83 | 84 | 110 | 111 |
| Resin composition | Thermoplastic elastomer composition | Kind | Ex. 1 | Ex. 2 | Ex. 3 | Ex. 4 | Ex. 5 | Ex. 6 | Ex. 7 | — | Com. Ex. 1 |
|  |  | part by weight | 40 | 40 | 40 | 40 | 40 | 40 | 40 | — | 40 |
|  | Polar group-containing resin | Kind | POM | POM | POM | POM | POM | POM | POM | POM | POM |
|  |  | part by weight | 60 | 60 | 60 | 60 | 60 | 60 | 60 | 100 | 60 |
| Evaluation result | Specific gravity | — | 1.22 | 1.22 | 1.23 | 1.23 | 1.21 | 1.19 | 1.19 | 1.41 | 1.22 |
|  | Hardness | Shore A | 97 | 92 | 97 | 97 | 95 | 95 | 95 | 80D | 90 |
|  | Tensile strength | MPa | 16.3 | 15.3 | 15.5 | 15.3 | 13.5 | 12.8 | 14.0 | 60 | 15.3 |
|  | 100% Modulus | MPa | 0.6 | 0.4 | 0.5 | 0.5 | 0.5 | 0.5 | 0.5 | 0 | 0.4 |
|  | Elongation | % | 220 | 240 | 220 | 230 | 200 | 190 | 150 | 60 | 240 |
|  | Injection moldability | visually | A | A | A | A | A | A | A | A | B |
|  | Extrusion moldability | visually | A | A | A | A | A | A | A | B | B |
|  | Bleeding resistance | visually | A | A | A | A | A | A | A | A | A |

|  |  |  | Comparative Example |  |  |  |  |  |  |  |
|---|---|---|---|---|---|---|---|---|---|---|
|  |  |  | 112 | 113 | 114 | 115 | 116 | 117 | 118 | 119 |
| Resin composition | Thermoplastic elastomer composition | Kind | Com. Ex. 2 | Com. Ex. 3 | Com. Ex. 4 | Com. Ex. 5 | Com. Ex. 6 | Com. Ex. 7 | Com. Ex. 8 | Com. Ex. 9 |
|  |  | part by weight | 40 | 40 | 40 | 40 | 40 | 40 | 40 | 40 |
|  | Polar group-containing resin | Kind | POM | POM | POM | POM | POM | POM | POM | POM |
|  |  | part by weight | 60 | 60 | 60 | 60 | 60 | 60 | 60 | 60 |
| Evaluation result | Specific gravity | — | 1.22 | 1.22 | 1.22 | 1.22 | 1.22 | 1.22 | 1.19 | 1.19 |
|  | Hardness | Shore A | 91 | 92 | 90 | 97 | 97 | 97 | 90 | 87 |
|  | Tensile strength | MPa | 15.3 | 15.4 | 15.2 | 13.9 | 14.5 | 14.3 | 12 | 12.6 |
|  | 100% Modulus | MPa | 0.4 | 0.4 | 0.3 | 0.6 | 0.5 | 0.6 | 0.2 | 0.4 |
|  | Elongation | % | 200 | 240 | 230 | 80 | 100 | 120 | 180 | 150 |
|  | Injection moldability | visually | B | B | B | A | A | A | B | B |
|  | Extrusion moldability | visually | B | B | B | A | A | A | B | B |
|  | Bleeding resistance | visually | A | A | B | A | A | A | A | A |

As is apparent from Table 12, the thermoplastic elastomer compositions of Examples 1 to 7 are excellent in compatibility with POM, and there can be obtained POM-based thermoplastic resin compositions excellent in a balance of flexibility and mechanical properties, moldability, and bleeding resistance as compared with the case of POM alone shown in Comparative Example 110.

Comparative Examples 111 to 119

Each of the thermoplastic elastomer compositions obtained in Comparative Examples 1 to 9 and POM were blended in a ratio of 40:60 (% by weight), and the physical properties, injection moldability, extrusion moldability, and bleeding resistance of the pellets obtained from the resulting composition in the same manner as in Examples 78 to 84 were evaluated. The results are shown in Table 12. The thermoplastic elastomer compositions of Comparative Examples 1 to 9 falling outside the invention are inferior in compatibility with POM, and moldability and bleeding resistance have became worse.

The thermoplastic elastomer composition of the invention is rich in flexibility, excellent in thermal deformation resistance and moldability, excellent in compatibility with a resin having a polar group, and capable of softening the resin having a polar group due to the excellent flexibility, so that it can be used as various molding materials and the like, particularly as modifiers for polar group-containing resins. The thermoplastic resin composition comprising the thermoplastic elastomer composition and the resin having a polar group is rich in flexibility, excellent in bleeding resistance, and less in gas generation and entrainment of bubbles into molded articles during the molding, so that it can be used in the fields of electric wires-electric parts, industrial machine parts, medical equipment parts, food-related parts, automobile parts, building materials, and the like.

While the present invention has been described in detail and with reference to specific embodiments thereof, it will be apparent to one skilled in the art that various changes and modifications can be made therein without departing from the spirit and scope thereof.

The present application is based on Japanese patent application No. 2004-44131 filed Feb. 20, 2004, the contents thereof being herein incorporated by reference.

What is claimed is:

1. A thermoplastic elastomer composition comprising:
   (a) 100 parts by weight of at least one hydrogenated block copolymer;
   (b) 0.01 to 3 parts by weight of an organic peroxide; and
   (c) 1 to 80 parts by weight of a carboxylated liquid polybutadiene, wherein the carboxylated liquid polybutadiene is maleylated liquid polybutadiene, wherein a vinyl 1,2-bond in the microstructure of the polybutadiene of the component (c) accounts for 30% by weight or less, wherein a cis-1,4-bond in the microstructure of the polybutadiene of the component (c) accounts for 40% by weight or more, wherein the maleylated liquid polybutadiene has an acid value from 70 to 90 mgKOH/g, as determined in accordance with DIN ISO 3682, and wherein the maleylated liquid polybutadiene has a viscosity from 6 to 9 Pa·s, as determined in accordance with DIN 53214 (20° C.).

2. The thermoplastic elastomer composition according to claim 1, wherein the component (a) comprises a hydrogenated block copolymer obtained by hydrogenating 50% or more of a conjugate diene block of a block copolymer comprising at least two polymer blocks A mainly comprising an aromatic vinyl compound and at least one polymer block B mainly comprising a conjugated diene compound, and/or a hydrogenated product of a conjugated diene block copolymer.

3. The thermoplastic elastomer composition according to claim 1, wherein the component (a) comprises:
   (i) 95 to 5% by weight of a hydrogenated block copolymer obtained by hydrogenating 90% or more of a conjugate diene block of a block copolymer comprising at least two polymer blocks A mainly comprising an aromatic vinyl compound and at least one polymer block B mainly comprising a conjugated diene compound; and
   (ii) 5 to 95% by weight of a hydrogenated block copolymer obtained by hydrogenating 50% to less than 90% of a conjugate diene block of a block copolymer comprising at least two polymer blocks A mainly comprising an aromatic vinyl compound and at least one polymer block B mainly comprising a conjugated diene compound.

4. The thermoplastic elastomer composition according to claim 1, wherein the number average molecular weight of the component (a) in terms of polystyrene is in the range of 50,000 to 400,000.

5. The thermoplastic elastomer composition according to claim 1, which further comprises (d) 1 to 350 parts by weight of a rubber softener.

6. The thermoplastic elastomer composition according to claim 1, which further comprises (e) 0.02 to 10 parts by weight of an ester-based crosslinking aid.

7. The thermoplastic elastomer composition according to claim 1, which further comprises (f) 1 to 500 parts by weight of an isobutylene-based block copolymer comprising an isobutylene-based polymer block and an aromatic vinyl-based polymer block.

8. The thermoplastic elastomer composition according to claim 1, which further comprises (g) 1 to 200 parts by weight of an inorganic filler.

9. A thermoplastic resin composition comprising:
   5 to 75% by weight of the thermoplastic elastomer composition according to claim 1; and
   95 to 25% by weight of a resin having a polar group.

10. The thermoplastic resin composition according to claim 9, wherein the resin having a polar group is at least one resin selected from the group consisting of ionomers, acrylic rubbers, ethylene-ethyl acrylate copolymers, ethylene-methacrylate copolymers, ethylene-vinyl acetate copolymers, saponified ethylenevinyl acetate copolymers, polyamide-based resins, polyamide-based thermoplastic elastomers, biodegradable polyester-based resins, polyester-based resins, polyester-based thermoplastic elastomers, urethane-based thermoplastic elastomers, polyacetals, nitrile-butadiene rubbers, and partially crosslinked nitrile-butadiene rubbers.

11. A molded article comprising the thermoplastic resin composition according to claim 9.

12. The thermoplastic elastomer composition according to claim 1, wherein the maleylated liquid polybutadiene has from 6% to 20% of its double bonds maleylated.

* * * * *